(12) United States Patent
Song et al.

(10) Patent No.: US 12,340,547 B2
(45) Date of Patent: Jun. 24, 2025

(54) ELECTRONIC DEVICE AND METHOD FOR DETECTING TARGET OBJECTS

(71) Applicant: Samsung Electronics Co., Ltd., Suwon-si (KR)

(72) Inventors: Juyong Song, Suwon-si (KR); Byeongcheol Kang, Suwon-si (KR); Youngchul Sohn, Suwon-si (KR); Ilgu Kang, Suwon-si (KR); Sunghyun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 18/066,695

(22) Filed: Dec. 15, 2022

(65) Prior Publication Data

US 2023/0206581 A1 Jun. 29, 2023

Related U.S. Application Data

(63) Continuation of application No. PCT/KR2022/019101, filed on Nov. 29, 2022.

(30) Foreign Application Priority Data

Dec. 28, 2021 (KR) .......... 10-2021-0190339
Jan. 21, 2022 (KR) .......... 10-2022-0009236

(51) Int. Cl.
*G06V 10/22* (2022.01)
*G06V 10/774* (2022.01)

(52) U.S. Cl.
CPC ............ *G06V 10/22* (2022.01); *G06V 10/774* (2022.01)

(58) Field of Classification Search
CPC ...... G06V 10/22; G06V 10/774; G06V 10/25; G06V 10/764; G06V 10/82
See application file for complete search history.

(56) References Cited

U.S. PATENT DOCUMENTS

| | | |
|---|---|---|
| 9,165,390 B2 | 10/2015 | Matsumoto |
| 9,373,057 B1 * | 6/2016 | Erhan .................. G06F 18/214 |
| 10,489,684 B2 | 11/2019 | Choi et al. |
| 10,699,169 B2 * | 6/2020 | Kang ..................... G06V 10/80 |
| 10,936,902 B1 | 3/2021 | Bagwell et al. |

(Continued)

FOREIGN PATENT DOCUMENTS

| | | |
|---|---|---|
| JP | 5923746 B | 5/2016 |
| KR | 10-2020-0063304 A | 6/2020 |

(Continued)

OTHER PUBLICATIONS

International Search Report dated Mar. 17, 2023, issued in International Patent Application No. PCT/KR2022/019101.

*Primary Examiner* — Aaron W Carter
(74) *Attorney, Agent, or Firm* — Jefferson IP Law, LLP

(57) ABSTRACT

An electronic device for detecting a target object is configured to obtain a plurality of first candidate boxes corresponding to a first object and a plurality of second candidate boxes corresponding to a second object by applying an image is provided. The electronic device includes the first object and the second object to an artificial intelligence model, wherein the artificial intelligence model is trained to use a loss function for reducing a size difference between candidate boxes corresponding to two adjacent objects to determine sizes of the candidate boxes.

20 Claims, 20 Drawing Sheets

(56) References Cited

U.S. PATENT DOCUMENTS

| | | |
|---|---|---|
| 10,949,225 B2 | 3/2021 | Fernandes et al. |
| 11,010,605 B2 | 5/2021 | Nord et al. |
| 11,210,537 B2 | 12/2021 | Koivisto et al. |
| 11,688,081 B2 | 6/2023 | Yang et al. |
| 2017/0243077 A1* | 8/2017 | Fukui .................... G06V 10/464 |
| 2018/0032840 A1* | 2/2018 | Yu ......................... G06V 10/774 |
| 2019/0279045 A1* | 9/2019 | Li ........................... G06V 10/82 |
| 2020/0066036 A1* | 2/2020 | Choi ........................ G06T 17/10 |
| 2020/0265255 A1 | 8/2020 | Li et al. |
| 2021/0056708 A1 | 2/2021 | Li |
| 2021/0073558 A1 | 3/2021 | Li et al. |
| 2021/0073597 A1 | 3/2021 | Han et al. |
| 2022/0020175 A1* | 1/2022 | Wang ..................... G06V 20/13 |
| 2023/0005237 A1* | 1/2023 | Kamimura ............. G06V 10/70 |
| 2023/0025770 A1* | 1/2023 | Lee ......................... G06V 20/58 |
| 2023/0206581 A1* | 6/2023 | Song .................... G06V 10/774 |
| | | 382/159 |
| 2023/0215125 A1* | 7/2023 | Luo ...................... G06V 10/774 |
| | | 382/159 |
| 2023/0386164 A1* | 11/2023 | Park ....................... G06N 3/084 |
| 2023/0386231 A1* | 11/2023 | Lee ...................... G06V 10/774 |

FOREIGN PATENT DOCUMENTS

| | | |
|---|---|---|
| KR | 10-2020-0071808 A | 6/2020 |
| KR | 10-2021-0002104 A | 1/2021 |
| KR | 10-2021-0024242 A | 3/2021 |
| KR | 10-2021-0029586 A | 3/2021 |
| KR | 10-2021-0051722 A | 5/2021 |

\* cited by examiner

ELECTRONIC DEVICE AND METHOD FOR DETECTING TARGET OBJECTS

CROSS-REFERENCE TO RELATED APPLICATION(S)

This application is a continuation application, claiming priority under § 365(c), of an International application No. PCT/KR2022/019101, filed on Nov. 29, 2022, which is based on and claims the benefit of a Korean patent application number 10-2021-0190339, filed on Dec. 28, 2021, in the Korean Intellectual Property Office, and of a Korean patent application number 10-2022-0009236, filed on Jan. 21, 2022, in the Korean Intellectual Property Office, the disclosure of each of which is incorporated by reference herein in its entirety.

TECHNICAL FIELD

The disclosure relates to an electronic device and a method for detecting a target object included in an input image.

BACKGROUND ART

An image recognition system or an object detection system configured to detect an object in an image may detect a single object or a plurality of objects from a digital image or a video frame and perform semantic segmentation. The detection of an object may refer to a series of processes including estimating a position and size of an image included in an image in a form of a bounding box and classifying a particular object in a given image. Furthermore, semantic segmentation may refer to subdivision of an exact form of an object in units of pixels in the detected object box.

In many cases, an image input for detection of an object may be given in the form of a grid. In most of such cases, the objects included in the image may also be arranged in the form of a grid. However, in related art, there have been issues of inaccurate location estimation of objects in the form of a grid or the inconvenience of a person having to directly draw a pattern.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic device and a method for more accurately detecting an object by using regularity of an input image provided in a form of a grid.

Additional aspects will be set forth in part in the description which follows and, in part, will be apparent from the description, or may be learned by practice of the presented embodiments.

Technical Solution to Problem

In accordance with an aspect of the disclosure, an electronic device configured to detect a target object is provided. The electronic device includes a display, a memory storing one or more instructions, and a processor configured to execute the one or more instructions stored in the memory, wherein the processor is further configured to, by executing the one or more instructions, apply an image including a first object and a second object and stored in the memory to an artificial intelligence model to obtain output data including first output data regarding the first object and second output data regarding the second object, the first output data regarding the first object includes data regarding a plurality of first candidate boxes corresponding to the first object, the second output data regarding the second object includes data regarding a plurality of second candidate boxes corresponding to the second object, a first detection box corresponding to the first object is determined by selecting one of the plurality of first candidate boxes, a second detection box corresponding to the second object is determined by selecting one of the plurality of second candidate boxes, the first detection box is used for detecting the first object in the image, and the second detection box is used for detecting the second object in the image, wherein the artificial intelligence model is trained to obtain a training image including a third object and a fourth object adjacent to the third object, output a plurality of third candidate boxes corresponding to the third object and a plurality of fourth candidate boxes corresponding to the fourth object by using the training image, and determine sizes of the plurality of third candidate boxes and the plurality of fourth candidate boxes by using a loss function for reducing a size difference between the third candidate boxes and the fourth candidates boxes.

In accordance with another aspect of the disclosure, a method of detecting a target object is provided. The method includes applying an image including a first object and a second object to an artificial intelligence model to obtain output data including first output data regarding the first object and second output data regarding the second object, wherein the first output data regarding the first object includes data regarding a plurality of first candidate boxes corresponding to the first object, and the second output data regarding the second object includes data regarding a plurality of second candidate boxes corresponding to the second object, determining a first detection box corresponding to the first object by selecting one of the plurality of first candidate boxes, determining a second detection box corresponding to the second object by selecting one of the plurality of second candidate boxes, and using the first detection box for detecting the first object in the image, and using the second detection box for detecting the second object in the image, wherein the artificial intelligence model is trained to obtain a training image including a third object and a fourth object adjacent to the third object, output a plurality of third candidate boxes corresponding to the third object and a plurality of fourth candidate boxes corresponding to the fourth object by using the training image, and determine sizes of the plurality of third candidate boxes and the plurality of fourth candidate boxes by using a loss function for reducing a size difference between the third candidate boxes and the fourth candidates boxes.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE OF DISCLOSURE

Figure 1:
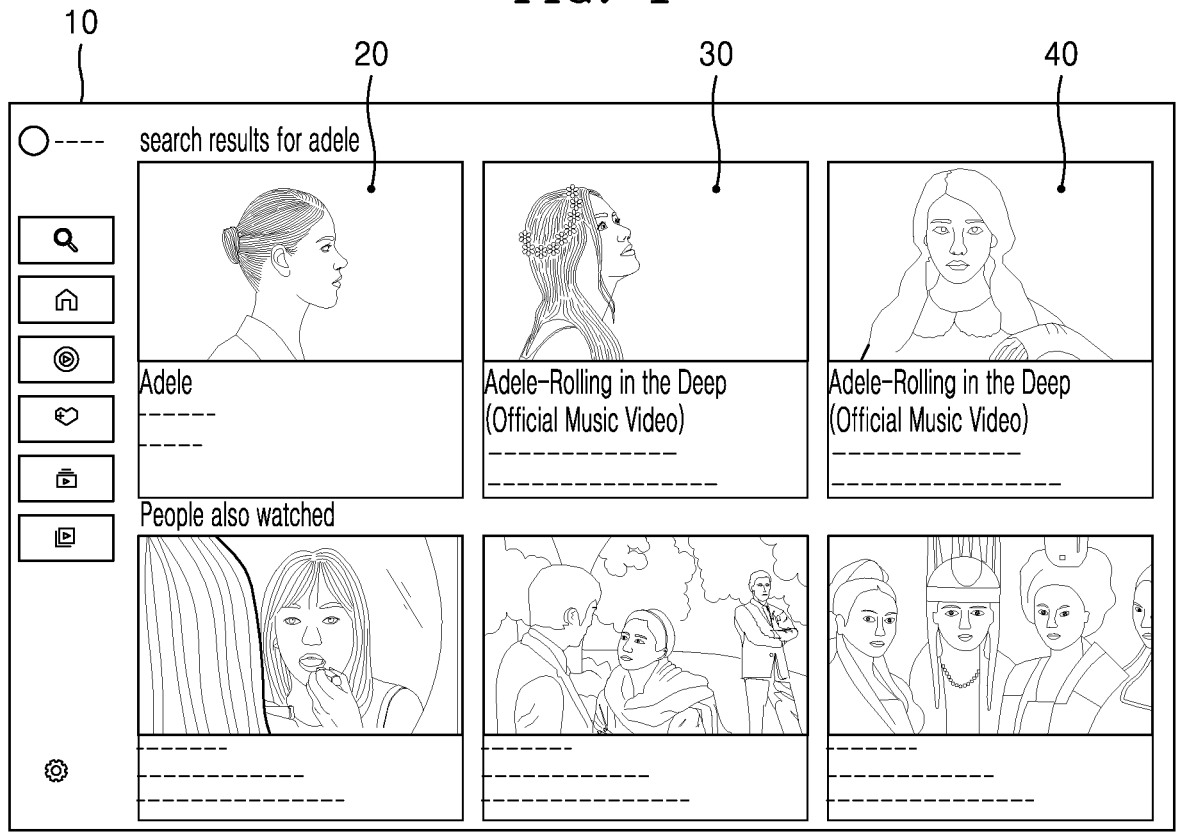
FIG. 1 is a diagram illustrating an example in which an object in a given image is detected in a form of grid, according to an embodiment of the disclosure.
Figure 1:
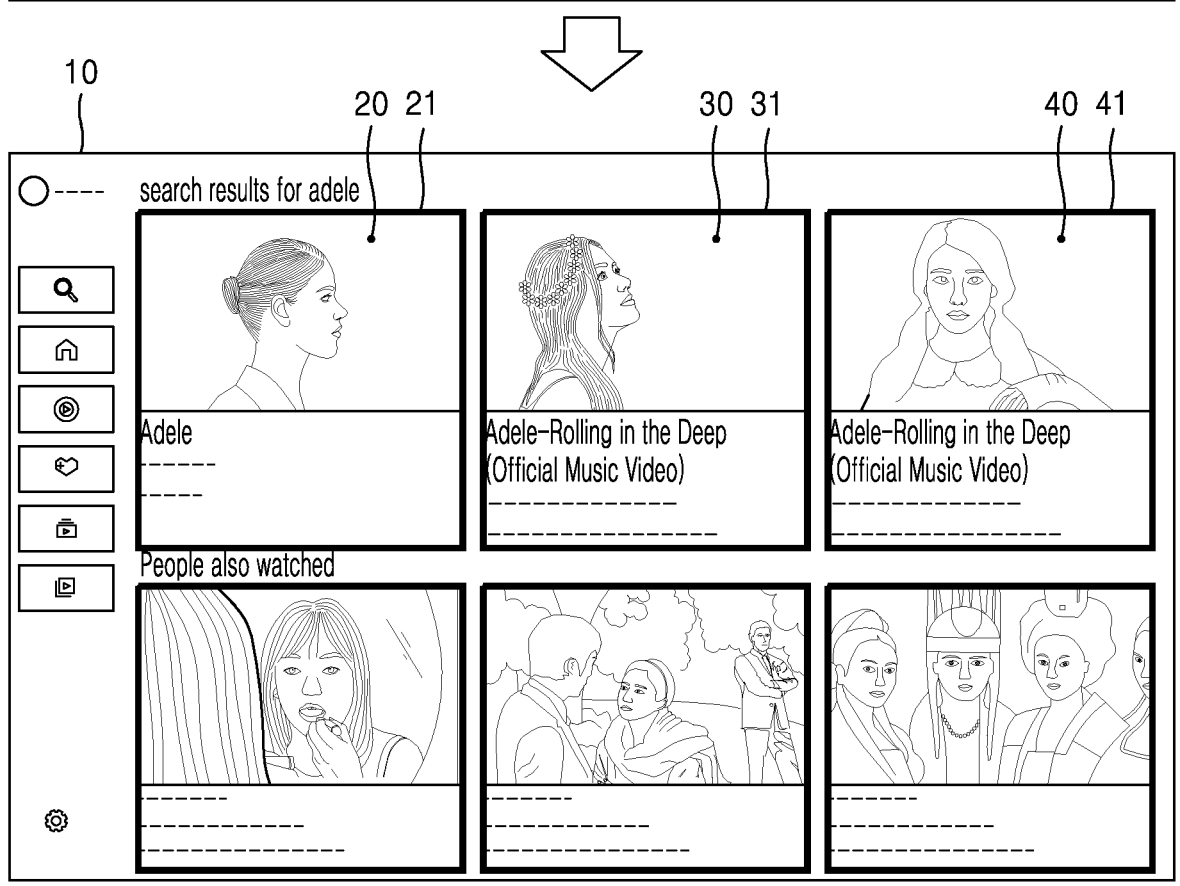

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the specification, when a portion is described as being connected to another portion, the portion may be connected directly to another portion, or electrically connected to another portion with an intervening portion therebetween. When a portion "includes" an element, another element may be further included, rather than excluding the existence of the other element, unless otherwise described.

The function associated with artificial intelligence according to the disclosure may be operated by a processor and a memory. The processor may include one processor or a plurality of processors. The one or more processors may be a general purpose processor, such as a central processing unit (CPU), an application processor (AP), etc., a graphic exclusive processor, such as a graphics processing unit (GPU) and a vision processing unit (VPU), or a processor for artificial intelligence, such as a neural network processing unit (NPU). The one or more processors may process input data according to predefined operation rules stored in the memory or by using the artificial intelligence model. Alternatively, when the one or more processors are a processor for artificial intelligence, the processor for artificial intelligence may be designed to have a hardware structure specialized for processing of particular artificial intelligence model.

The predefined operation rules or the artificial intelligence model may be established through learning. The meaning of being established through learning is that when a basic artificial intelligence model is trained by using multiple pieces of learning data by a learning algorithm, a predefined operation rules or artificial intelligence model configured to perform desired characteristics (or purposes) is generated. Such learning may be conducted in a device itself, in which artificial intelligence is performed according to the disclosure, or through a separate server and/or system. The learning algorithm may include supervised learning, unsupervised learning, semi-supervised learning or reinforcement learning; however, the learning algorithm is not limited thereto.

The artificial intelligence model may include a plurality of neural network layers. Each of the plurality of neural network layers may have a plurality of nodes and weight values and may perform neural network operations based on results of operations of previous layers and operations among the plurality of weight values. The plurality of weight values of the plurality of neural network layers may be optimized by the learning result of the artificial intelligence model. For example, during the learning process, the plurality of weight values may be updated such that a loss value or cost value obtained from the artificial intelligence model is reduced or minimized. Moreover, to minimize the loss value or the cost value, the plurality of weight values may be updated to minimize gradients related to the loss value or the cost value. The neural network may include a deep neural network (DNN), and may further include, for example, a convolutional neural network (CNN), transformers, recurrent neural network (RNN), restricted boltzmann machine (RBM), deep belief network (DBN), bidirectional recurrent deep neural network (BRDNN) or deep Q-networks; however, the neural network is not limited thereto.

The disclosure will now be described in detail with reference to the accompanying drawings.

FIG. 1 is a diagram illustrating an example in which an object in a given image is detected in a form of grid according to an embodiment of the disclosure.

Figure 2:
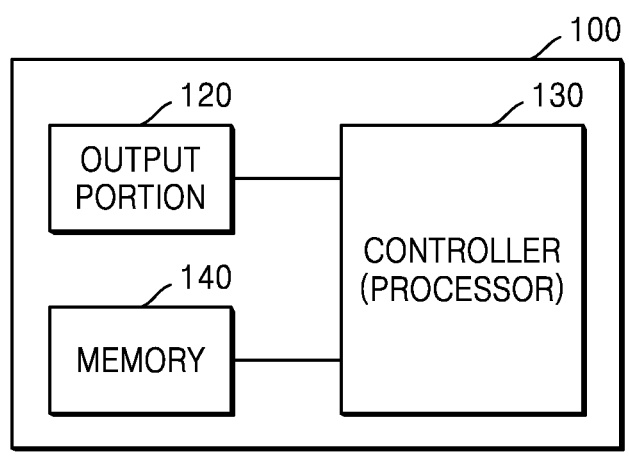
FIG. 2 illustrates a configuration of an electronic device according to an embodiment of the disclosure.

FIG. 2 illustrates configuration of an electronic device according to an embodiment of the disclosure.

Referring to FIGS. 1 and 2, an electronic device 100 configured to detect a target object according to an embodiment of the disclosure may include an output portion 120, a processor 130, and a memory 140 as illustrated in FIG. 2. However, not all of the components illustrated in FIG. 2 are essential for the electronic device 100. The electronic device 100 may be implemented by more or less components than the components illustrated in FIG. 2.

For example, the electronic device 100 may further include a user input portion and a communication unit in addition to the output portion 120, the processor 130, and the memory 140.

The output portion 120 may include a tool for output of an audio signal, a video signal, or a vibration signal. For example, the output portion 120 may include a display portion, an audio output portion, a vibration motor, etc.

The display portion may be controlled by the processor 130 to display information processed in the electronic device 100. The display portion may display at least one image. For example, the display portion may detect an object included in at least one image and display a detection box.

When the display portion has a layer structure including a touch pad and is implemented as a touch screen, the display portion may be used not only as an output device but also an input device. The display portion may include at least one from a liquid crystal display, a thin film transistor-liquid crystal display, an organic light-emitting diode, a flexible display, a three-dimensional display, and an electrophoretic display. The electronic device 100 may include two or more display portions according to the implementation form of the electronic device 100.

The audio output portion may output audio data received by the communication unit or stored in the memory. Moreover, the audio output portion may output an audio signal related to a function performed in the electronic device 100 (e.g., a message reception sound, an alarm sound, etc.) The audio output portion may include a speaker, a buzzer, etc.

The vibration motor may output a vibration signal. For example, the vibration motor may output a vibration signal corresponding to an output of audio data or video data (e.g., a message sound, an alarm sound, etc.) Furthermore, the vibration motor may output a vibration signal when a touch is input to the touch screen.

The processor 130 may control all operations of the electronic device 100 in general. The processor 130 may include at least one processor. The processor 130 may include a plurality of processor or one integrated processor according to a function and role of the processor 130.

According to an embodiment of the disclosure, the processor 130 may control all of a user input portion, the output portion 120, the communication unit, etc. by executing programs stored in the memory 140. Moreover, the processor 130 may control the user input portion, the output portion 120, and the communication unit so that the electronic device 100 provides a detection result of at least one object.

More specifically, the processor 130 may obtain an image including the first object and the second object stored in the memory 140 by executing one or more instructions stored in the memory 140 and generate a plurality of first candidate boxes corresponding to the first object and a plurality of second candidate boxes corresponding to the second object included in the image. The processor 130 may determine a first detection box corresponding to the first object by selecting one of the plurality of first candidate boxes and determine a second detection box corresponding to the second object by selecting one of the plurality of second candidate boxes. The processor 130 may detect the first object and the second object by using the determined first detection box and second detection box.

For example, as illustrated in FIG. 2, the processor 130 may generate a plurality of candidate boxes respectively corresponding to objects 20, 30, and 40 arranged in the form of a grid in the image 10 and determine detection boxes 21, 31, and 41 respectively corresponding to the objects 20, 30, and 40 by selecting one of the plurality of candidate boxes. The processor 130 may adjust the determined detection boxes 21, 31, and 41 to be in the form of a grid. Accordingly, the electronic device 100 may detect objects arranged in the form of a grid more accurately. The more specific process is to be described with reference to the drawings.

According to an embodiment of the disclosure, the processor 130 may include a component configured to perform training and application on at least one artificial intelligence model. The processor 130 may be construed as including a special processing unit configured to detect an object in an image by using at least one artificial intelligence model using an artificial intelligence technology.

More specifically, the artificial intelligence model may obtain a training image including a third object and a fourth object arranged adjacent to the third object and output a plurality of third candidate boxes corresponding to the third object and a plurality of fourth candidate boxes corresponding to the fourth object by using the training image. The artificial intelligence model may be trained to determine the sizes of the third candidate boxes and the fourth candidate boxes by using a loss function for reducing the difference between the sizes of the third candidate boxes and the fourth candidate boxes. The specific training method is to be described with reference to FIGS. 3, 4, 5A, and 5B.

Moreover, the processor 130 may control the communication unit so that the electronic device 100 receives and transmits an accessible image from and to an external device.

The memory 140 may store a program for processing and control performed by the processor 130 and may store data input to the electronic device 100 or output from the electronic device 100.

The memory 140 may include a storage medium of at least one type selected from flash memory type, hard disk type, multimedia card micro type, card type memory (e.g., secure digital (SD) or extreme digital (XD) memory, etc.), random access memory (RAM), static RAM (SRAM), read-only memory (ROM), electrically erasable programmable ROM (EEPROM), PROM, magnetic memory, magnetic disk, and optical disk.

The user input portion may refer to a tool through which data for controlling the electronic device 100 is input. For example, the user input portion may include a key pad, a dome switch, a touch pad (capacitive type, resistive type, infrared-sensitive type, surface ultrasonic conductive type, integral tension measurement type, piezo effect type, etc.), a jog wheel, a jot switch, etc.; however, the disclosure is not limited thereto.

The user input portion may receive a user input. For example, the user input portion may receive a user input for obtaining an image, executing an application, etc. Furthermore, the user input portion may receive a user input for selecting one graphic user interface among one or more displayed graphic user interfaces.

The communication unit may include one or more components configured to communicate with other devices (not shown) and servers.

For example, the communication unit may include a Bluetooth™ communication unit, a Bluetooth™ low energy (BLE) communication unit, a near field communication unit, a wireless local area network (WLAN) communication unit (wireless fidelity (Wi-Fi)), a Wi-Fi direct (WFD) communication unit, a ultra wideband (UWB) communication unit, an Ant+ communication unit, etc.; however, the communication methods are merely an example and do not limit the technical idea of the disclosure.

FIGS. 3, 4, 5A, and 5B are diagrams illustrating examples in which data is learned to accurately detect an object in a given image according to various embodiments of the disclosure.

Figure 6:
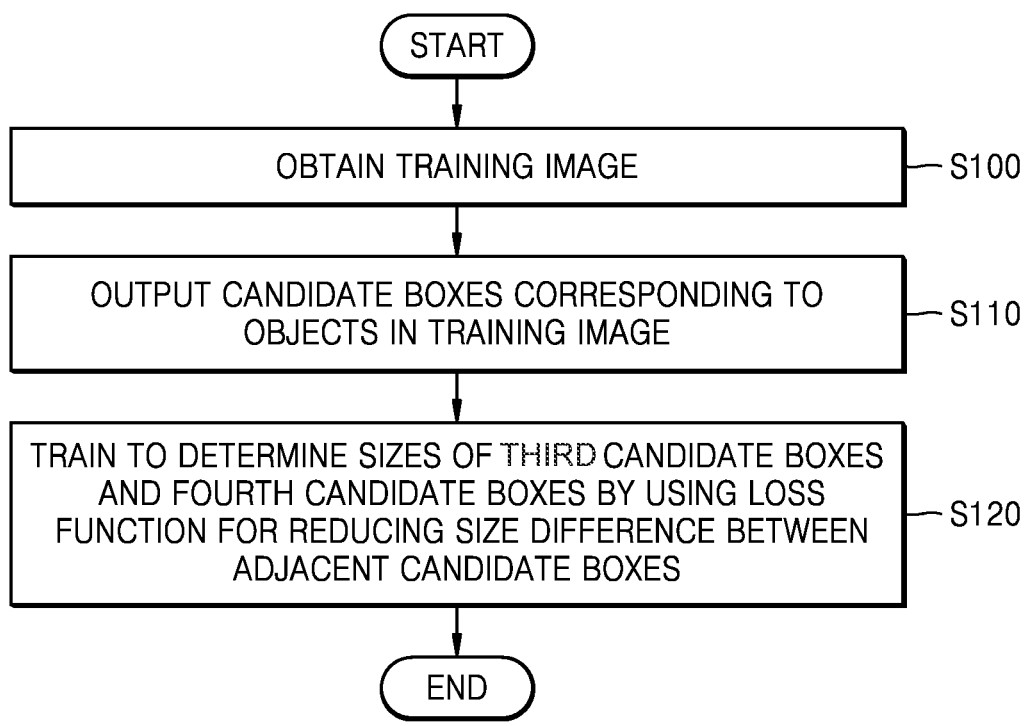
FIG. 6 is a flowchart of a method of learning data to accurately detect an object in a given image, according to an embodiment of the disclosure.

FIG. 6 is a flowchart of a method of learning data to accurately detect an object in a given image according to an embodiment of the disclosure.

Figure 3:
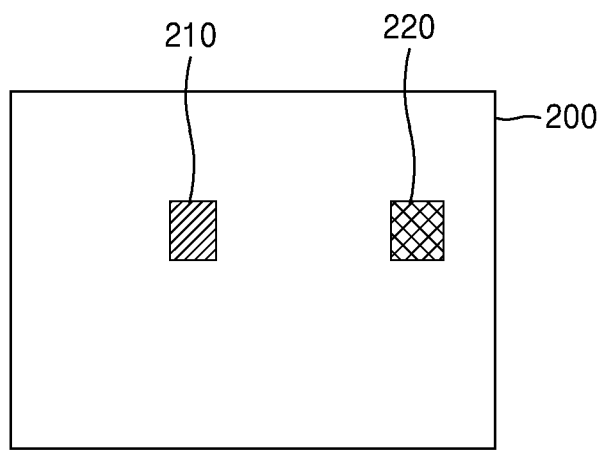
FIGS. 3, 4, 5A, and 5B are diagrams illustrating examples in which data is learned to accurately detect an object in a given image according to various embodiments of the disclosure.

Referring to FIG. 3, a processor 130 may obtain a training image 200 according to an embodiment of the disclosure.

The training image 200 may include a third object 210 and a fourth object 220. The third object 210 and the fourth object 220 may be arranged adjacent to each other in the horizontal direction.

However the direction in which the third object 210 and the fourth object 220 are arranged is provided merely as an example, and the technical idea of the disclosure is not limited thereto. For example, the third object 210 and the fourth object 220 may be arranged adjacent to each other in a second direction. That is, the third object 210 and the fourth object 220 may be arranged adjacent to each other in the vertical direction.

Figure 4:
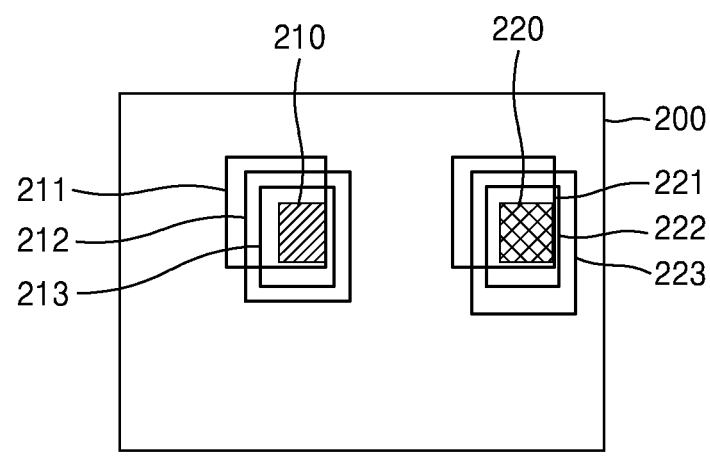

Referring to FIG. 4, an artificial intelligence model may output a plurality of candidate boxes (i.e., third candidate boxes 211, 212, and 213 and fourth candidate boxes 221, 222, and 223) respectively corresponding to each of a plurality of objects (i.e., a third object 210 and a fourth object 220).

The artificial intelligence model may output the third candidate boxes 211, 212, and 213 and the fourth candidate boxes 221, 222, and 223. The third candidate boxes 211, 212, and 213 may correspond to the third object 210. The fourth candidate boxes 221, 222, and 223 may correspond to the fourth object 220. The number and position of the third candidate boxes 211, 212, and 213 and the fourth candidate boxes 221, 222, and 223 are provided merely as an example, and the technical idea of the disclosure is not limited thereto.

The artificial intelligence model may be trained by using a loss function for reducing a size difference between the third candidate boxes 211, 212, and 213 and the fourth candidate boxes 221, 222, and 223. The artificial intelligence model may be trained to output a lower loss function value. More specifically, the loss function may be represented by the following Equation 1.

$$L_{grid} = L_{reg} + \sum_{i}\left[\lambda_1\left(\sum_{j}\frac{K(\hat{h}_i, \hat{h}_j)}{K(\hat{x}_i, \hat{x}_j) + \epsilon}\right) + \lambda_2\left(\sum_{j}\frac{K(\hat{w}_i, \hat{w}_j)}{K(\hat{y}_i, \hat{y}_j) + \epsilon}\right)\right] \quad \text{Equation 1}$$

$L_{reg}$ is a regression loss function of the existing object detection technology. $L_{reg}=\Sigma_i[|x_i-\hat{x}_i|+|y_i-\hat{y}_i|+|w_i-\hat{w}_i|+|h_i-\hat{h}_i|]$, etc. are commonly used as the regression loss function of the existing object detection technology; however, the regression loss function is not limited thereto. $K_{(a,b)}$ is an odd function representing a distance, and an absolute value of a difference between two values ($|a-b|$), a square term ($(a-b)^2$), a gaussian kernel $$(\exp\left(\frac{(a-b)^2}{\sigma^2}\right)),$$

etc. may be used, but the odd function is not limited thereto. An example of using an absolute value may be represented as the following Equation 2.

$$L_{grid} = L_{reg} + \sum_{i}\left[\lambda_1\left(\sum_{j}\frac{|\hat{h}_i - \hat{h}_j|}{|\hat{x}_i - \hat{x}_j| + \epsilon}\right) + \lambda_2\left(\sum_{j}\frac{|\hat{w}_i - \hat{w}_j|}{|\hat{y}_i - \hat{y}_j| + \epsilon}\right)\right] \quad \text{Equation 2}$$

i and j represent the number of grid elements where objects are positioned. For example, with reference to FIG. 3, the number of grid element where the third object 210 is positioned may be 1, and the number of grid element where the fourth object 220 is positioned may be 2.

j represents the number of grid element adjacent to the i grid. For example, when i is 1, j is 2.

$x_i$ and $x_j$ are the positions of objects arranged at certain grid elements in the horizontal direction, respectively, and $\hat{w}_i$ and $\hat{w}_j$ are the positions of candidate boxes corresponding to the objects arranged at certain grid elements in the horizontal direction, respectively.

$y_i$ and $y_j$ are the positions of objects arranged at certain grid elements in the vertical direction, respectively, and $\hat{y}_i$ and $\hat{y}_j$ are the positions of candidate boxes corresponding to the objects arranged at certain grid elements in the vertical direction, respectively.

$w_i$ and $w_j$ are lengths (widths) of objects arranged at certain grid elements in the horizontal direction, respectively, and $\hat{w}_i$ and $\hat{w}_j$ are lengths (widths) of candidate boxes corresponding to the objects arranged at certain grid elements in the horizontal direction, respectively.

$h_i$ and $h_j$ are lengths (heights) of objects arranged at certain grid elements in the vertical direction, respectively, and $\hat{h}_i$ and $\hat{h}_j$ are lengths (heights) of candidate boxes corresponding to the objects arranged at certain grid elements in the vertical direction, respectively.

$\lambda_1$ and $\lambda_2$ are hyper parameters. That is, $\lambda_1$ and $\lambda_2$ are values set directly by a user. For example, $\lambda_1$ may be set as 0.0001.

$\epsilon$ is a constant to prevent denominator values of the $\lambda_1$ and $\lambda_2$ terms from being 0.

With reference to the $\lambda_1$ term of Equation 1, to output a value with a less loss function, the less a difference between positions of a candidate box of the i grid and a candidate box of the j grid in the horizontal direction, the less a difference between lengths of the candidate box of the i grid and the candidate box of the j grid in the vertical direction needs to be. That is, the artificial intelligence model may be trained to reduce the difference between lengths of the candidate boxes in the vertical direction, i.e., a difference between heights of the candidate boxes when the candidate box of the i grid and the candidate box of the j grid in the horizontal direction are arranged closer to each other in the horizontal direction.

With reference to the $\lambda_2$ term of Equation 1, to output a value with a less loss function, the less a difference between positions of a candidate box of the i grid and a candidate box of the j grid in the vertical direction, the less a difference between lengths of the candidate box of the i grid and the candidate box of the j grid in the horizontal direction needs to be. That is, the artificial intelligence model may be trained to reduce the difference between lengths of the candidate boxes in the horizontal direction, i.e., a difference between widths of the candidate boxes when the candidate box of the i grid and the candidate box of the j grid in the vertical direction are arranged closer to each other in the horizontal direction.

Thus, according to an embodiment of the disclosure, by using a loss function according to Equation 1, the artificial intelligence model may be trained to reduce the difference between the heights of adjacent candidate boxes when the adjacent candidate boxes are positioned closer in the horizontal direction and to reduce the difference between the widths of adjacent candidate boxes when the adjacent candidate boxes are positioned closer in the vertical direction. That is, the artificial intelligence model may be trained to render sizes of adjacent candidate boxes similar.

Equation 1 is merely an example of the art rendering the sizes of candidate boxes similar, and the technical ides of the disclosure is not limited thereto.

Figure 5A:
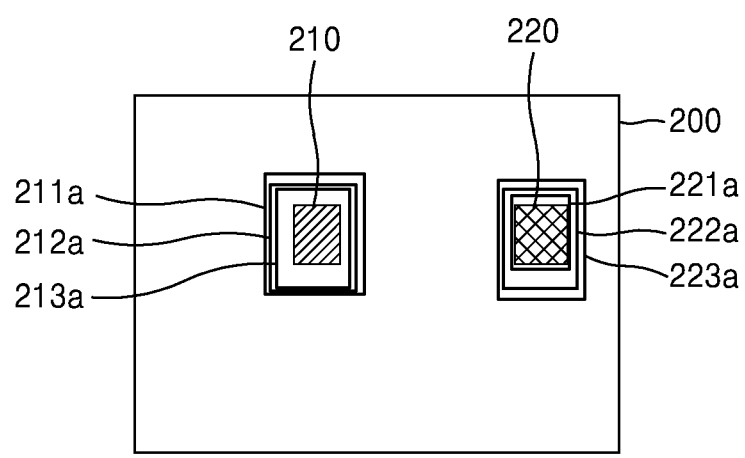

Accordingly, referring to FIG. 5A, the third object 210 may be arranged at the first grid element, and the fourth object 220 may be arranged at the second grid element. The third object 210 and the fourth object 220 may be arranged in the horizontal direction. A plurality of third candidate boxes 211a, 212a, and 213a corresponding to the third object 210 may be generated at the first grid, and a plurality of fourth candidate boxes 221a, 222b, and 223a corresponding to the fourth object 220 may be generated at the second grid.

The position and size of the third candidate boxes 211a, 212a, and 213a may be adjusted based on data of the fourth candidate boxes 221a, 222a, and 223a positioned at the adjacent second grid. The data of the fourth candidate boxes 221a, 222a, and 223a may be data regarding the position and size of the fourth candidate boxes 221a, 222a, and 223a.

More specifically, the artificial intelligence model may be trained to reduce the length difference (height difference) of the third candidate boxes 211a, 212a, and 213a and the fourth candidate boxes 221a, 222a, and 223a in the vertical direction when the third candidate boxes 211a, 212a, and 213a arranged at the first grid and the fourth candidate boxes 221a, 222a, and 223a arranged at the second grid are positioned closer to each other in the horizontal direction such that a value with less loss function is output. Accordingly, compared to the third candidate boxes 211, 212, and 213 illustrated in FIG. 4, the size of the fourth candidate boxes 221a, 222a, and 223a illustrated in FIG. 5A may be adjusted to be respectively similar to the size of the adjacent fourth candidate boxes 221a, 222a, and 223a in the horizontal direction.

Similarly, the size of the fourth candidate boxes 221a, 222a, and 223a may be adjusted to respectively similar to the size of the adjacent third candidate boxes 211a, 212a, and 213a in the vertical direction. Accordingly, the artificial intelligence model may output the candidate boxes to facilitate the detection of objects arranged in the form of a grid in the image.

Figure 5B:
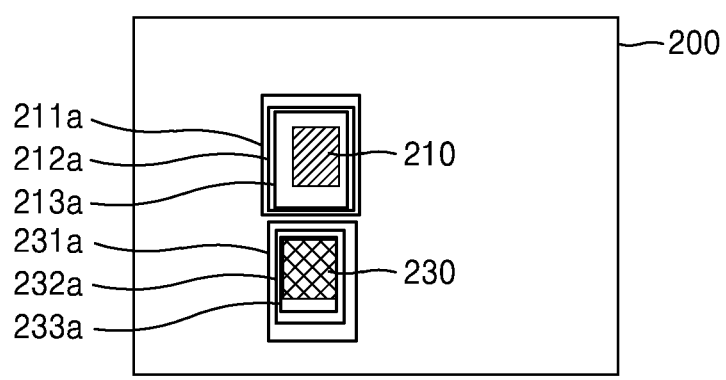

Moreover, referring to FIG. 5B, a third grid may be arranged apart from the first grid in the vertical direction. The third object 210 may be positioned at the first grid and a fifth object 230 may be positioned at the third grid. The plurality of third candidate boxes 211, 212, and 213 corresponding to the third object 210 may be generated at the first grid, and a plurality of fifth boxes corresponding to the fifth object 230 may be generated at the third grid.

The position and size of the third candidate boxes 211, 212, and 213 may be adjusted based on data of the fifth candidate boxes positioned at the adjacent third grid. The data of the fifth candidate boxes may be data regarding the position and size of the fifth candidate boxes.

More specifically, the artificial intelligence model may be trained to reduce the length difference (width difference) in the horizontal direction when the third candidate boxes 211, 212, and 213 arranged at the first grid and the fifth candidate boxes arranged at the third grid are positioned closer to each other in the vertical direction such that a value with less loss function is output. Accordingly, the size of the third candidate boxes 211a, 212a, and 213a may be adjusted to respectively similar to the size of the adjacent fifth candidate boxes 231a, 232a, and 233a in the vertical direction.

Similarly, the size of the fifth candidate boxes 231a, 232a, and 233a may be adjusted to respectively similar to the size of the adjacent third candidate boxes 211a, 212a, and 213a in the vertical direction. Accordingly, the artificial intelligence model may output the candidate boxes to facilitate the detection of objects arranged in the form of a grid in the image.

Referring to FIG. 6, an artificial intelligence model may obtain a training image at operation S100. The training image may include a third object and a fourth object. A plurality of objects in the training image may be arranged in a form of a grid. The third object and the fourth object may refer to target objects which are included in the training image and to be detected. For example, as illustrated in FIG. 3, the artificial intelligence model may obtain the training image 200 including the third object 210 and the fourth object 220.

The artificial intelligence model may output third candidate boxes and fourth candidate boxes corresponding to the objects in the training image at operation S110. The artificial intelligence model may output the third candidate boxes and the fourth candidate boxes by using the training image. The third candidate boxes may correspond to the third object 210 and the fourth candidate boxes may correspond to the fourth object 220. The third candidate boxes and the fourth candidate boxes may be used to detect the third object 210 and the fourth object 220, respectively. For example, as illustrated in FIG. 4, the artificial intelligence model may generate the candidate boxes (i.e., the third candidate boxes 211, 212, and 213, and the fourth candidate boxes 221, 222, and 223) corresponding to the objects (i.e., the third object 210 and the fourth object 220) in the training image 200.

The artificial intelligence model may be trained by using a loss function to reduce a difference between sizes of adjacent candidate boxes at operation S120. The artificial intelligence model may be trained to determine the sizes of the third candidate boxes and the fourth candidate boxes by using a loss function for reducing the difference between the sizes of the third candidate boxes and the fourth candidate boxes. For example, as illustrated in FIG. 5A, the artificial intelligence model may adjust the size of the candidate boxes based on adjacent candidate boxes. That is, the artificial intelligence model may adjust the position and size of the fourth candidate boxes 221a, 222a, and 223a based on the third candidate boxes 211a, 212a, and 213a. Moreover, the artificial intelligence model may adjust the position and size of the third candidate boxes 211a, 212a, and 213a based on the fourth candidate boxes 221a, 222a, and 223a.

Figure 7:
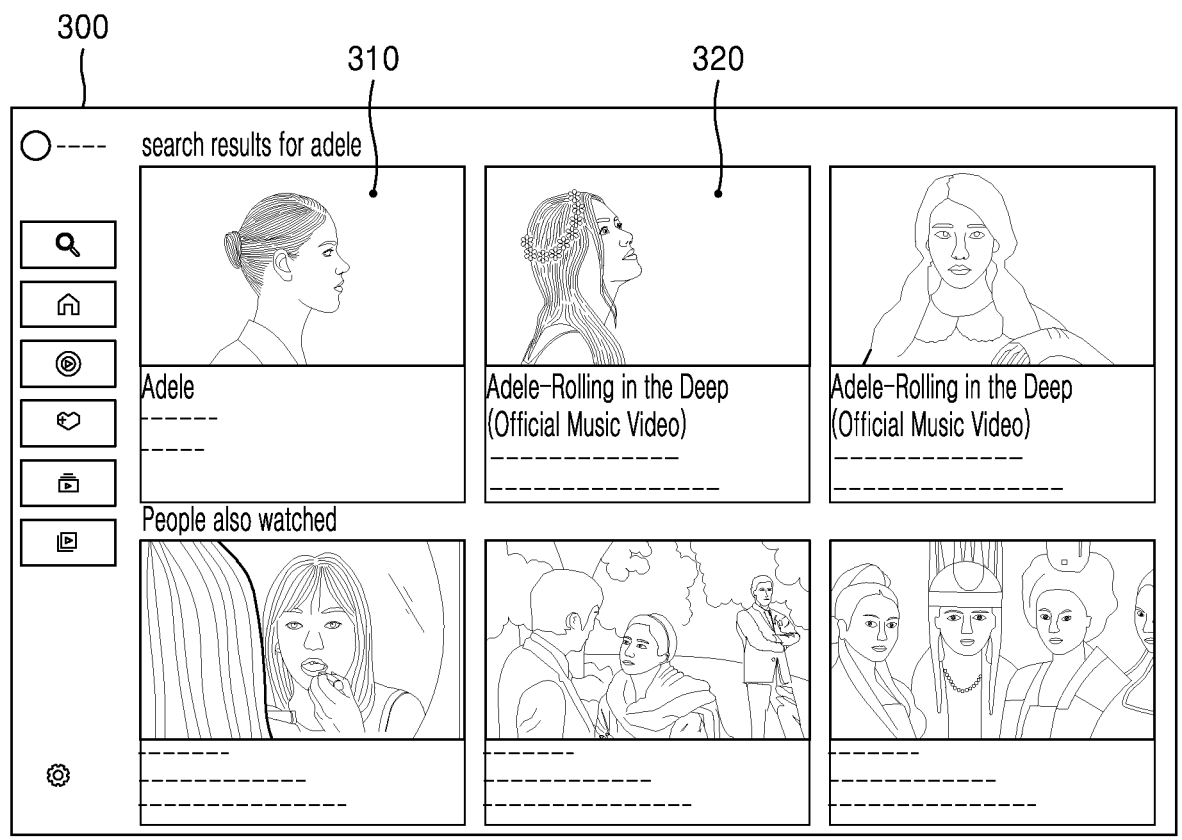
FIGS. 7, 8, and 9 are diagrams of a method of accurately detecting an object in a given image according to various embodiments of the disclosure.
Figure 8:
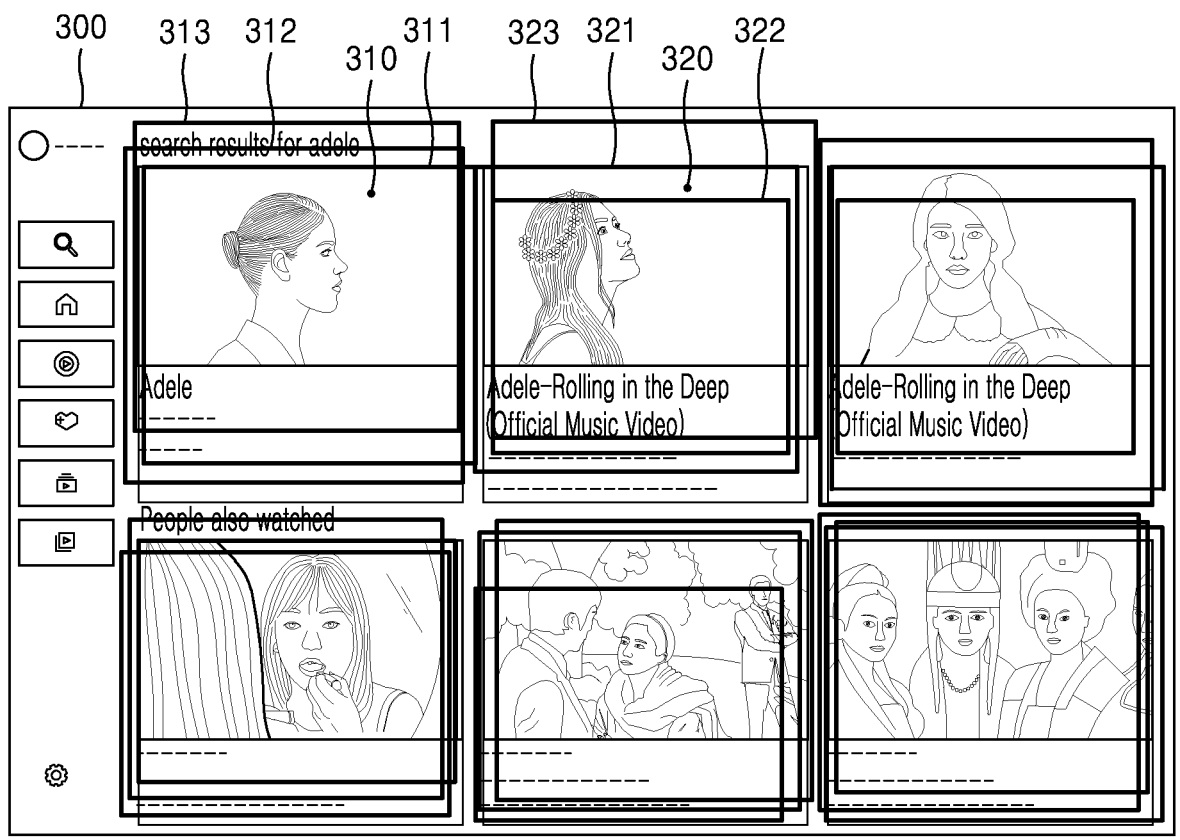
Figure 9:
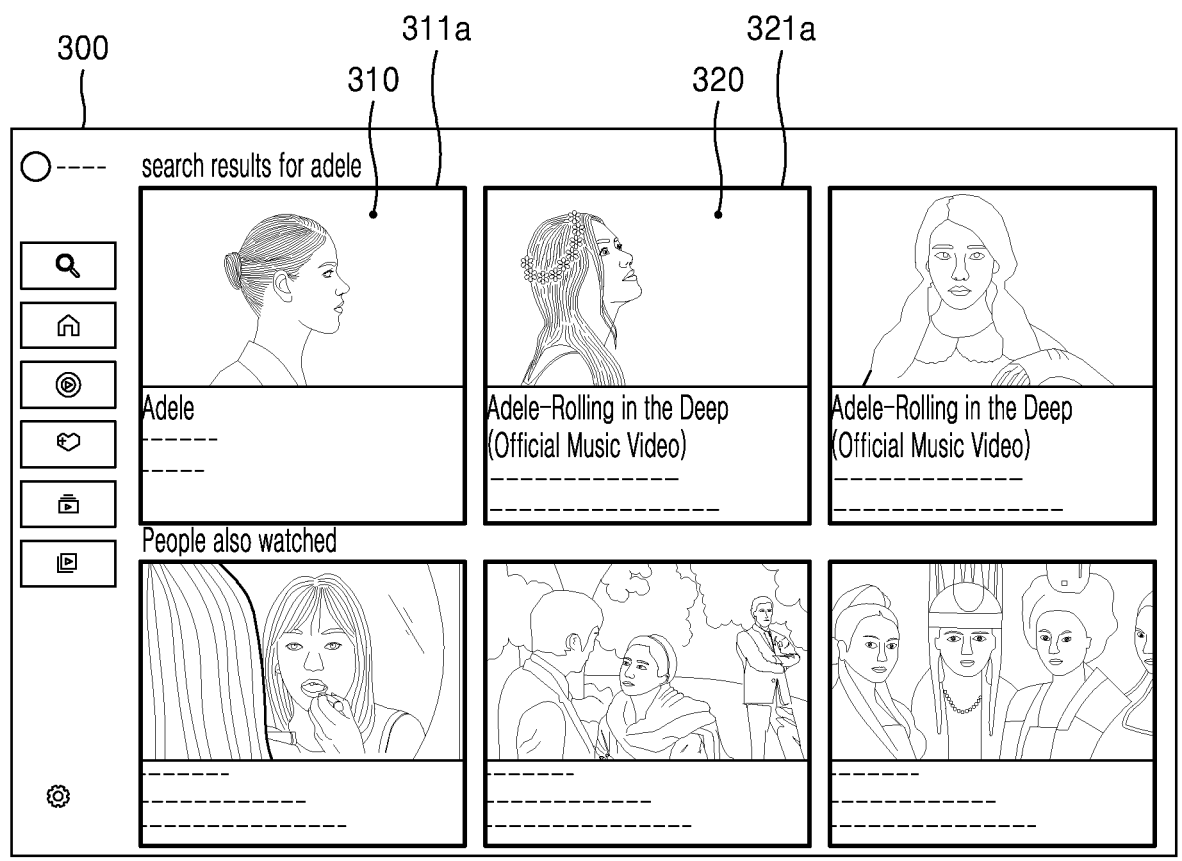

FIGS. 7, 8, and 9 are diagrams of a method of accurately detecting an object in a given image according to various embodiments of the disclosure.

Figure 10:
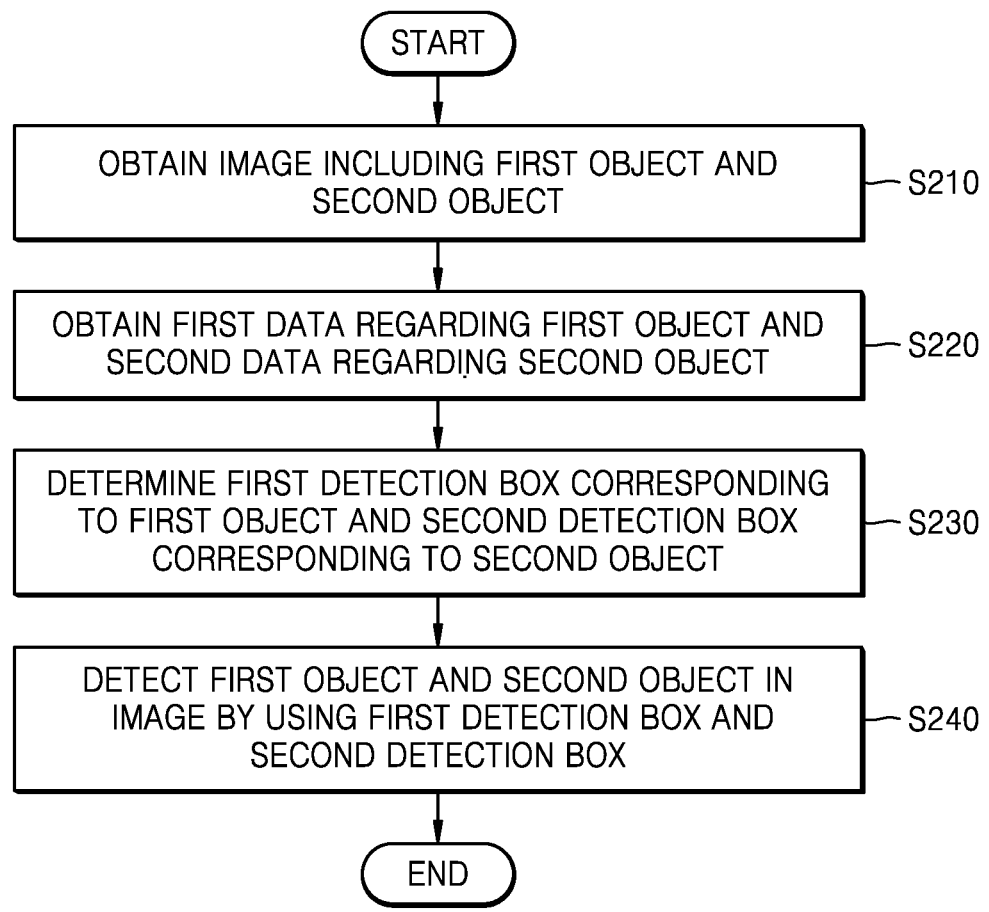
FIG. 10 is a diagram of a method of accurately detecting an object in a given image, according to an embodiment of the disclosure.

FIG. 10 is a diagram of a method of accurately detecting an object in a given image according to an embodiment of the disclosure.

Referring to FIG. 7, an image 300 may be obtained according to an embodiment of the disclosure.

The obtained image 300 may include a first object 310 and a second object 320. The first object 310 and the second object 320 in the image 300 may be arranged in the form of a grid. The obtained image 300 may further include a plurality of objects in addition to the first object 310 and the second object 320; however, the technical idea of the disclosure is described by using the first object 310 and the second object 320 for convenience in explanation.

Referring to FIG. 8, an obtained image 300 may be applied to the artificial intelligence model according to an embodiment of the disclosure. The artificial intelligence model may be a model trained through the method described with reference to FIGS. 3, 4, 5A, and 5B. Accordingly, the artificial intelligence model may generate first candidate boxes 311, 312, and 313 corresponding to the first object 310 and second candidate boxes 321, 322, and 323 corresponding to the second object 320.

The first candidate boxes 311, 312, and 313 and the second candidate boxes 321, 322, and 323 may be generated to detect the first object 310 and the second object 320, respectively. The position and size of the first candidate boxes 311, 312, and 313 and the second candidate boxes 321, 322, and 323 are illustrated merely as an example, and the technical idea of the disclosure is not limited thereto.

The processor 130 may apply the input image 300 to the artificial intelligence model to obtain output data including first output data and second output data.

The first output data may be data regarding the first object 310. The first output data may include data regarding the first candidate boxes 311, 312, and 313 corresponding to the first object 310. For example, the first output data may be data regarding the position and size of the first candidate boxes 311, 312, and 313.

The second output data may be data regarding the second object 320. The second output data may include data regarding the second candidate boxes 321, 322, and 323 corresponding to the second object 320. For example, the second output data may be data regarding the position and size of the second candidate boxes 321, 322, and 323.

Referring to FIG. 9, according to an embodiment of the disclosure, a processor 130 may determine detection boxes (i.e., a first detection box 311a and a second detection box 321a) respectively corresponding to objects (i.e., a first object 310 and a second object 320).

The plurality of first candidate boxes 311, 312, and 313 may be positioned corresponding to the first object 310. By selecting one of the plurality of first candidate boxes 311, 312, and 313, the first detection box 311a may be determined. The first detection box 311a may correspond to the first object 310.

The plurality of second candidate boxes 321, 322, and 323 may be positioned corresponding to the second object 320. By selecting one of the plurality of second candidate boxes 321, 322, and 323, the second detection box 321a may be determined. The second detection box 321a may correspond to the second object 320.

According to an embodiment of the disclosure, to select one of the plurality of candidate boxes, a non-maximum suppression (NMS) algorithm may be used. For convenience in explanation, the NMS algorithm is described by using the first object 310 and the second object 320 illustrated in FIGS. 8 and 9.

More specifically, reliability may be calculated with respect to the plurality of first candidate boxes 311, 312, and 313. The first candidate box 311 having the highest reliability with respect to a class, among the plurality of first candidate boxes 311, 312, and 313, may be selected. Then, the first detection box 311a may be determined by removing unselected first candidate boxes 312 and 313, excluding the selected first candidate box 311.

The class may be a type of an object given as an input in an image. For example, in an image related to FIGS. 7 to 9, the class may be contents, function tabs, etc. For another example, in an image for detecting animals, the class may be a dog, a cat, etc.

The reliability may be a probability value representing a probability of an object matching one class with respect to a certain object in a candidate box. For example, in an image for detecting animals, the probability value representing a probability of an object matching one class (dog) with respect to a dog in one candidate box may be represented as reliability.

More specifically, the reliability may be represented by the following Equation 3. For reference, the reliability used herein is Adjusted Confidence[i] of Equation 3. The reliability may include a first reliability and a second reliability. The first reliability is Confidence[i] of Equation 3, and may represent a degree of correspondence of the plurality of first candidate boxes 311, 312, and 313 to the first object 310 in the image 300. The second reliability is $\lambda_1$ term and $\lambda_2$ term of Equation 3, and may represent a relation between the plurality of first candidate boxes 311, 312, and 313 and the plurality of second candidate boxes 321, 322, and 323 in the image 300.

$$\text{Adjusted Confidence}[i] = \text{Confidence}[i] + \lambda_1 \left( \sum_j \frac{1}{K(\hat{h}_i, \hat{h}_j) + \epsilon} \right) + \lambda_2 \left( \sum_j \frac{1}{K(\hat{w}_i, \hat{w}_j) + \epsilon} \right) \quad \text{Equation 3}$$

$K(a,b)$ is an odd function representing a distance, and an absolute value of a difference between two values ($|a-b|$), a square term $((a-b)^2)$, a gaussian kernel $$\left( \exp\left( \frac{(a-b)^2}{\sigma^2} \right) \right),$$

etc. may be used, but the odd function is not limited thereto. An example of using an absolute value may be represented as the following Equation 4.

$$\text{Adjusted Confidence}[i] = \text{Confidence}[i] + \lambda_1 \left( \sum_j \frac{1}{|\hat{h}_i - \hat{h}_j| + \epsilon} \right) + \lambda_2 \left( \sum_j \frac{1}{|\hat{w}_i - \hat{w}_j| + \epsilon} \right) \quad \text{Equation 4}$$

i and j represent the number of grid elements where objects are positioned. For example, referring to FIG. 9, the number of grid element where the first object 310 is positioned is 1, and the number of grid element where the second object 320 is positioned is 2.

j represents the number of grid element adjacent to the i grid. For example, when i is 1, j is 2.

Confidence[i] is a reliability used in object detection methods in related arts. Confidence[i] represents a probability of an object in a candidate box being included in each class, the probability being calculated though a softmax function.

$w_i$ and $w_j$ are lengths (widths) of objects arranged at certain grid elements in the horizontal direction, respectively, and $\hat{w}_i$ and $\hat{w}_j$ are lengths (widths) of candidate boxes corresponding to the objects arranged at certain grid elements in the horizontal direction, respectively.

$h_i$ and $h_j$ are lengths (heights) of objects arranged at certain grid elements in the vertical direction, respectively, and $\hat{h}_i$ and $\hat{h}_j$ are lengths (heights) of candidate boxes corresponding to the objects arranged at certain grid elements in the vertical direction, respectively.

$\lambda_1$ and $\lambda_2$ are hyper parameters. That is, $\lambda_1$ and $\lambda_2$ are values set directly by a user. For example, $\lambda_i$ may be set as 0.0001.

$\varepsilon$ is a constant to prevent denominator values of the $\lambda_1$ and $\lambda_2$ terms from being 0.

With reference to the $\lambda_1$ term of Equation 3, to obtain high second reliability, a length difference between the candidate box of the i grid and the candidate box of the j grid in the vertical direction, i.e., the difference between the heights of the candidate boxes may need to be small. Accordingly, the more similar the heights of the candidate box of the i grid and the candidate box of the j grid in the vertical direction are, the higher the second reliability may be calculated.

With reference to the $\lambda_2$ term of Equation 3, to obtain high second reliability, a length difference between the candidate box of the i grid and the candidate box of the j grid in the horizontal direction, i.e., the difference between the widths of the candidate boxes may need to be small. Accordingly, the more similar the widths of the candidate box of the i grid and the candidate box of the j grid in the horizontal direction are, the higher the second reliability may be calculated.

According to an embodiment of the disclosure, by using the reliability according to Equation 3, a candidate box having a similar size to adjacent candidate boxes may have high reliability. More specifically, the more similar the size of the candidate box is to the size of adjacent candidate boxes, the higher the second reliability the candidate box may have.

Equation 3 is provided merely as an example of a method of calculating a reliability for selecting a candidate box properly corresponding to an object in an image, and the technical idea of the disclosure is not limited thereto.

Accordingly, by the trained artificial intelligence model, the first output data regarding the position of the plurality of first candidate boxes 311, 312, and 313 determined considering position information of the plurality of second candidate boxes 321, 322, and 323. Moreover, the second output data may include data regarding the position of the plurality of second candidate boxes 321, 322, and 323 determined considering position information of the plurality of first candidate boxes 311, 312, and 313.

With respect to the first candidate boxes 312 and 313 other than the selected first candidate box 311, an intersection over union (IOU) of the selected first candidate box 311 may be calculated. The IOU may be a ratio of an overlapping area to an area of union of two candidate boxes subject to comparison. When the IOU is calculated greater than the threshold value, other first candidate boxes 312 and 313 used in calculation may be removed. In this manner, the first detection box 311a corresponding to the first object 310 may be determined. For example, a threshold value may be 0.35; however, the technical idea of the disclosure is not limited thereto.

Similarly, the second candidate box 321 having the highest reliability with respect to one class (contents), among the plurality of second candidate boxes 321, 322, and 323 may be selected. Then, the IOU of the selected second candidate box 321 may be calculated with respect to the second candidate boxes 322 and 323 other than the selected second candidate box 321. When the IOU is calculated greater than the threshold value, other second candidate boxes 322 and 323 used in calculation may be removed. For example, a threshold value may be 0.35; however, the technical idea of the disclosure is not limited thereto.

The processor 130 may detect the first object 310 in the image 300 based on the first detection box 311a and detect the second object 320 in the image 300 based on the second detection box 321a.

Referring to FIG. 10, a processor may obtain the image 300 including a first object 310 and a second object 320 at operation S210. The first object 310 and the second object 320 in the image 300 may be arranged in the form of a grid. The first object 310 and the second object 320 may be arranged in the horizontal direction; however, this is merely an example, and the technical idea of the disclosure is not limited thereto. For example, the first object and the second object may be arranged in the vertical direction.

The processor may obtain output data including first output data and second output data at operation S220. The first output data may be data regarding the first object. The first output data may include data regarding first candidate boxes corresponding to the first object. The second output data may be data regarding the second object. The second output data may include data regarding second candidate boxes corresponding to the second object.

For example, the first output data may be data regarding the position and size of the first candidate boxes and the second output data may be data regarding the position and size of the second candidate boxes.

The processor may determine the first detection box 311a by selecting one of the plurality of first candidate boxes 311, 312, and 313, and determined the second detection box 321a by selecting one of the plurality of second candidate boxes 321, 322, and 323 at operation S230. The first detection box 311a may correspond to the first object 310 and the second detection box 321a may correspond to the second object 320.

The processor may detect the first object 310 and the second object 320 in the obtained image based on the first detection box 311a and the second detection box 321a at operation S240.

FIGS. 11, 12, 13, and 14 are diagrams illustrating a method of reconfiguring a detection box in a form of a grid to accurately detect an object in a given image according to various embodiments of the disclosure.

Figure 15:
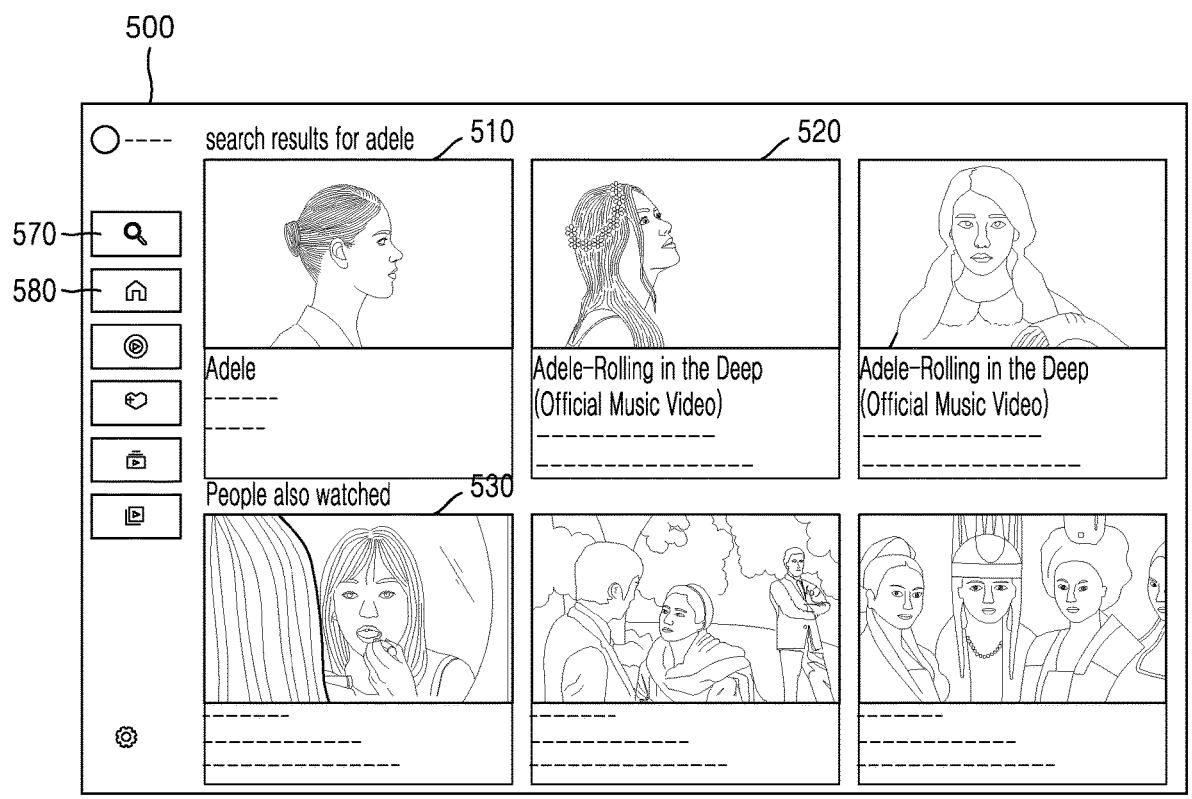
FIGS. 15, 16, 17, 18, and 19 are diagrams illustrating a method of grouping objects in a given image, according to various embodiments of the disclosure.

FIG. 15 is a flowchart of a method of reconfiguring a detection box in a form of a grid to accurately detect an object in a given image according to an embodiment of the disclosure.

For convenience in explanation, any redundant description about features explained with reference to FIGS. 7 to 10 may be briefly provided or omitted.

Figure 11:
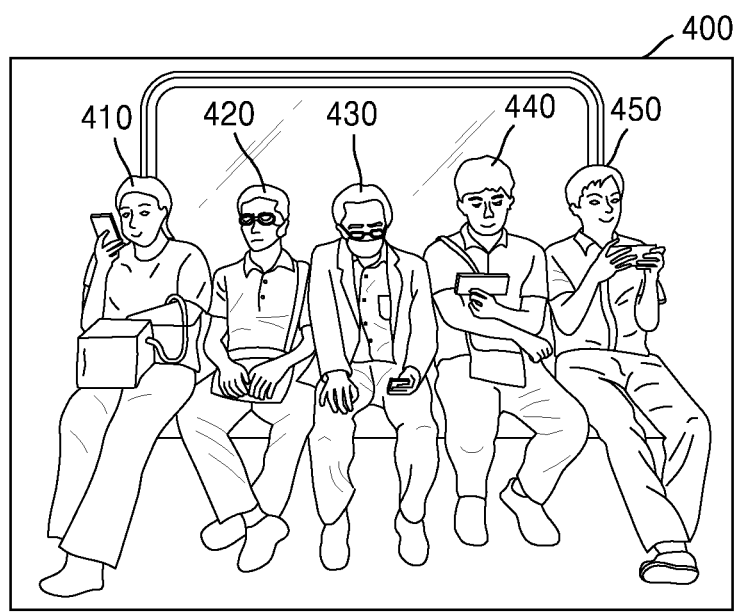
FIGS. 11, 12, 13, and 14 are diagrams illustrating a method of reconfiguring a detection box in a form of a grid to accurately detect an object in a given image, according to various embodiments of the disclosure.

Referring to FIG. 11, a processor 130 may obtain an image 400 including a plurality of objects 410, 420, 430, 440, and 450 arranged in the form of a grid. For example, as illustrated in the drawings, the plurality of objects 410 to 450 in the image 400 may be arranged side by side in the horizontal direction. Accordingly, the plurality of objects 410 to 450 in the image 400 may be arranged in the form of a grid.

The obtained image 400 may include the first object 410 and the second object 420. The obtained image 400 may further include a plurality of objects in addition to the first object 410 and the second object 420; however, the technical idea of the disclosure is described by using the first object 410 and the second object 420 for convenience in explanation.

Figure 12:
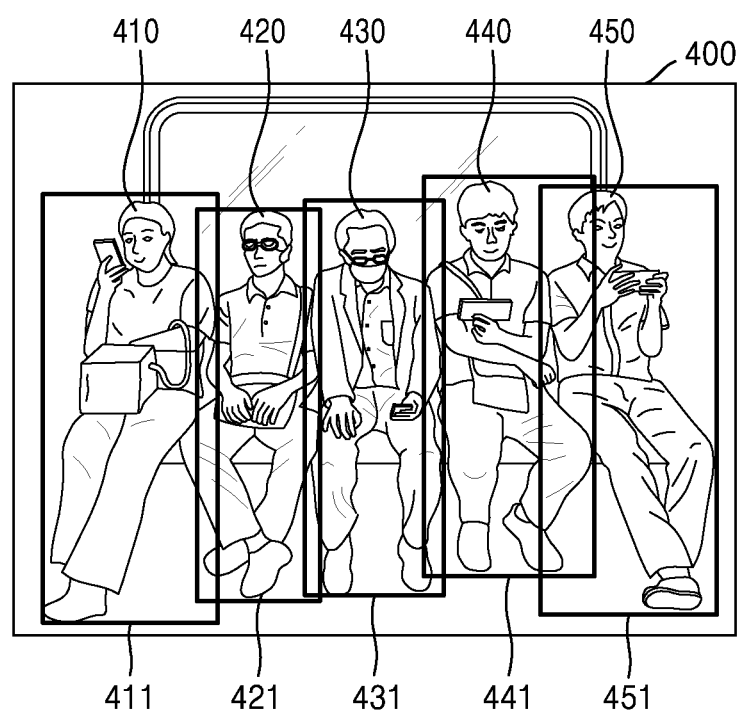

Referring to FIG. 12, a processor 130 may determine a plurality of detection boxes 411, 421, 431, 441, and 451 respectively corresponding to a plurality of objects 410, 420, 430, 440, and 450. That is, the processor 130 may determine the first detection box 411 corresponding to the first object 410 and the second detection box 421 corresponding to the second object 420. The method of determining the first detection box 411 and the second detection box 421 may be identical to the method described with reference to FIGS. 7 to 10.

Figure 13:
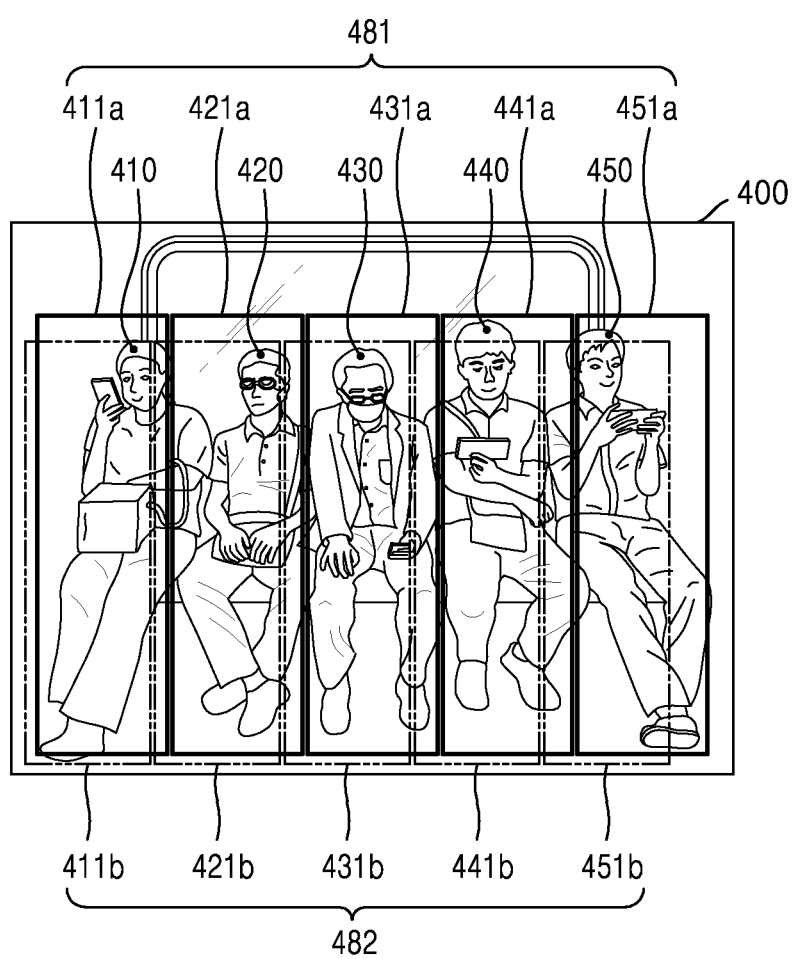

Referring to FIG. 13, a processor 130 may execute one or more instructions to adjust the determined first detection box 411 and the second detection box 421 in the form of a grid.

More specifically, the first detection box 411 and the second detection box 421 may be arranged adjacent to each other in the horizontal direction. A height of the first detection box 411 in the vertical direction and a height of the second detection box 421 in the vertical direction may be adjusted. The height of the first detection box 411 in the vertical direction and the height of the second detection box 421 in the vertical direction may be adjusted to be identical.

As the height of the first detection box 411 in the vertical direction and the height of the second detection box 421 in the vertical direction are adjusted, a plurality of candidate grid structures 481 and 482 may be formed. The drawings describe that two candidate grid structures 481 and 482 are formed; however, this is merely an example, and the number of candidate grid structures does not pose a limitation on the technical idea of the disclosure.

One candidate grid structure may include a plurality of detection boxes of which heights are adjusted to be identical to each other. For example, the first candidate grid structure 481 may include a plurality of detection boxes 411a, 421a, 431a, 441a, and 451a. The plurality of detection boxes 411a, 421a, 431a, 441a, and 451a may be detection boxes of which heights are adjusted to be identical to each other in the vertical direction. The plurality of detection boxes 411a, 421a, 431a, 441a, and 451a may constitute one candidate grid structure (e.g., the first candidate grid structure 481).

The plurality of candidate detection boxes including the first detection box 411a and the second detection box 421a in the first candidate grid structure 481 may be arranged in the form of a grid. The plurality of detection boxes 411a, 421a, 431a, 441a, and 451a in the first candidate grid structure 481 may respectively correspond to the plurality of objects 410, 420, 430, 440, and 450.

The first candidate grid structure 481 may include the plurality of detection boxes 411a, 421a, 431a, 441a, and 451a arranged in the form of a grid to detect the plurality of objects 410, 420, 430, 440, and 450 arranged in the form of a grid.

Similarly, another candidate grid structure (e.g., the second candidate grid structure 482) may include a plurality of detection boxes 411b, 421b, 431b, 441b, and 451b arranged in the form of a grid to detect the plurality of objects 410, 420, 430, 440, and 450 arranged in the form of a grid.

Although it is not shown in the drawings, as for the third detection box arranged in the vertical direction with respect to the first detection box 411a, a width of the first detection box 411a in the horizontal direction and a width of the third detection box in the horizontal direction may be adjusted. The width of the first detection box 411a in the horizontal direction and the width of the third detection box in the horizontal direction may be adjusted to be identical.

Accordingly, the plurality of detection boxes including the first detection box 411a and the third detection box may be arranged in the form of a grid. The plurality of detection boxes including the first detection box 411a and the third detection box may constitute one candidate grid structure.

Figure 14:
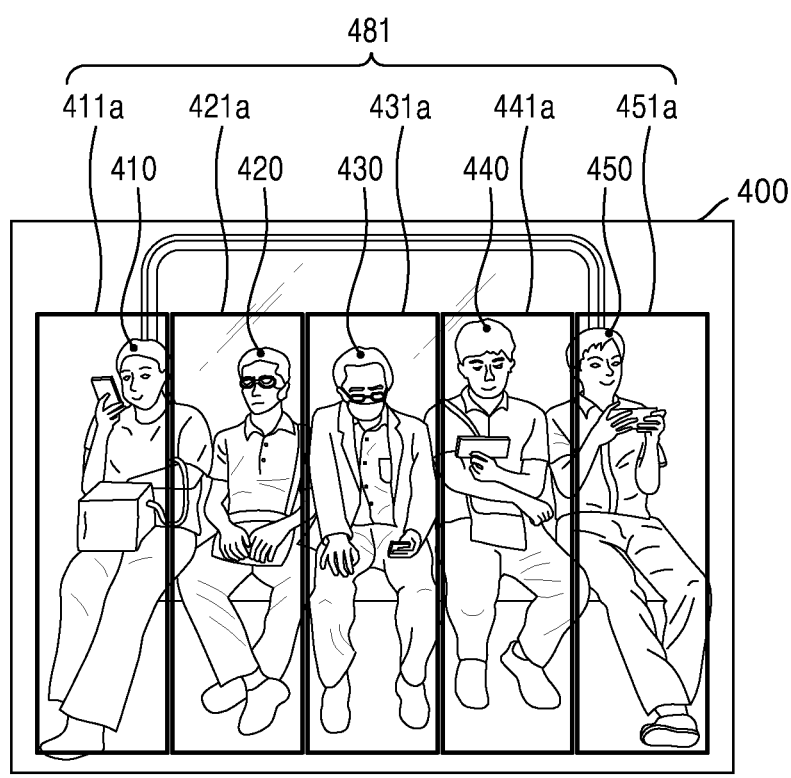

Referring to FIGS. 13 and 14, a processor 130 may select one candidate grid structure (e.g., a first candidate grid structure 481) from a plurality of candidate grid structures (i.e., a first candidate grid structure 481 and a second candidate grid structure 482) to determine a final grid structure (i.e., a first candidate grid structure 481). The final grid structure (i.e., the first candidate grid structure 481) may include the adjusted first detection box 411a and the adjusted second detection box 421a.

For convenience in explanation, the method of determining the final grid structure (e.g., the first candidate grid structure 481) by using the first candidate grid structure 481 and the second candidate grid structure 482.

The plurality of candidate grid structures (e.g., the first candidate grid structure 481, etc.) may include the plurality of detection boxes 411a to 451a respectively corresponding to the plurality of objects 410, 420, 430, 440, and 450. The plurality of detection boxes 411a to 451a in one candidate grid structure may have a first reliability for one class with respect to the corresponding objects 410, 420, 430, 440, and 450.

The reliability may be a probability value representing a probability of an object matching one class with respect to a certain object in a detection box. For reference, the first reliability used herein is Confidence[i] of Equation 3.

The first reliability may be calculated for each of the plurality of detection boxes 411a, 421a, 431a, 441a, and 451a in the first candidate grid structure 481. Then, a sum of the first reliabilities for the plurality of detection boxes 411a, 421a, 431a, 441a, and 451a included in the first candidate grid structure 481 may be calculated.

Similarly, the first reliability may be calculated for each of the plurality of detection boxes 411b, 421b, 431b, 441b, and 451b in the second candidate grid structure 482. Then, a sum of the first reliabilities for the plurality of detection boxes 411b, 421b, 431b, 441b, and 451b may be calculated.

From the plurality of candidate grid structures (i.e., the first candidate grid structure 481 and the second candidate grid structure 482), a candidate grid structure having the highest sum of the first reliabilities for the plurality of detection boxes in one candidate grid structure (e.g., the first candidate grid structure 481) may be selected. In this manner, the selected candidate grid structure (i.e., the first candidate grid structure 481) may be determined to be the final grid structure. That is, the final grid structure (e.g., the first candidate grid structure 481) including the plurality of detection boxes 411a to 451a respectively corresponding to the plurality of objects 410, 420, 430, 440, and 450 arranged in the form of grid may be determined.

The processor 130 may detect the plurality of objects 410, 420, 430, 440, and 450 arranged in the form of grid in the image 400 based on the final grid structure (e.g., the first candidate grid structure 481).

FIGS. 15, 16, 17, 18, and 19 are diagrams illustrating a method of grouping objects in a given image according to various embodiments of the disclosure.

For convenience in explanation, any redundant description about features explained referring to FIGS. 1 to 4, 5A, 5B, and 6 to 14 may be briefly provided or omitted.

Referring to FIG. 15, a processor 130 may execute one or more instructions to group a first object 510 and a second object 520 into a first group 501. A plurality of objects 510, 520, 530, 570, and 580 in an image 500 may be grouped into many groups according to their characteristics.

For example, the plurality of objects 510, 520, 530, 570, and 580 in the image 500 may be grouped into a group of great size objects including objects 510, 520, and 530 and a group of small size objects including objects 570 and 580 according to their size. For another example, the plurality of objects 510, 520, 530, 570, and 580 in the image 500 may be grouped into a group of objects arranged on the left side in the vertical direction (icons, e.g., objects 570 and 580) and a group of objects arranged on the right side in multiple rows (contents, e.g., objects 510, 520, and 530) according to their position.

Figure 16:
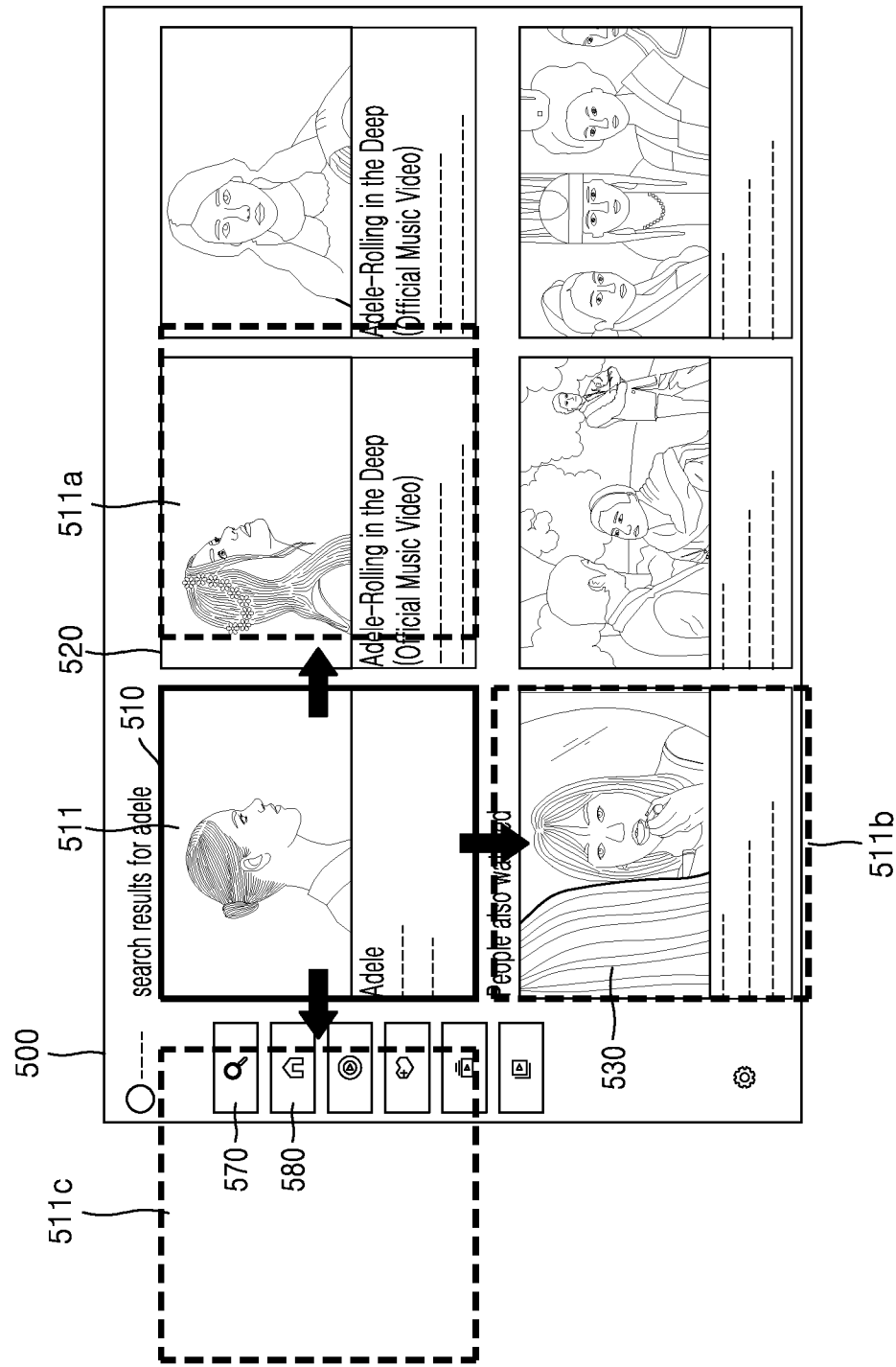
Figure 17:
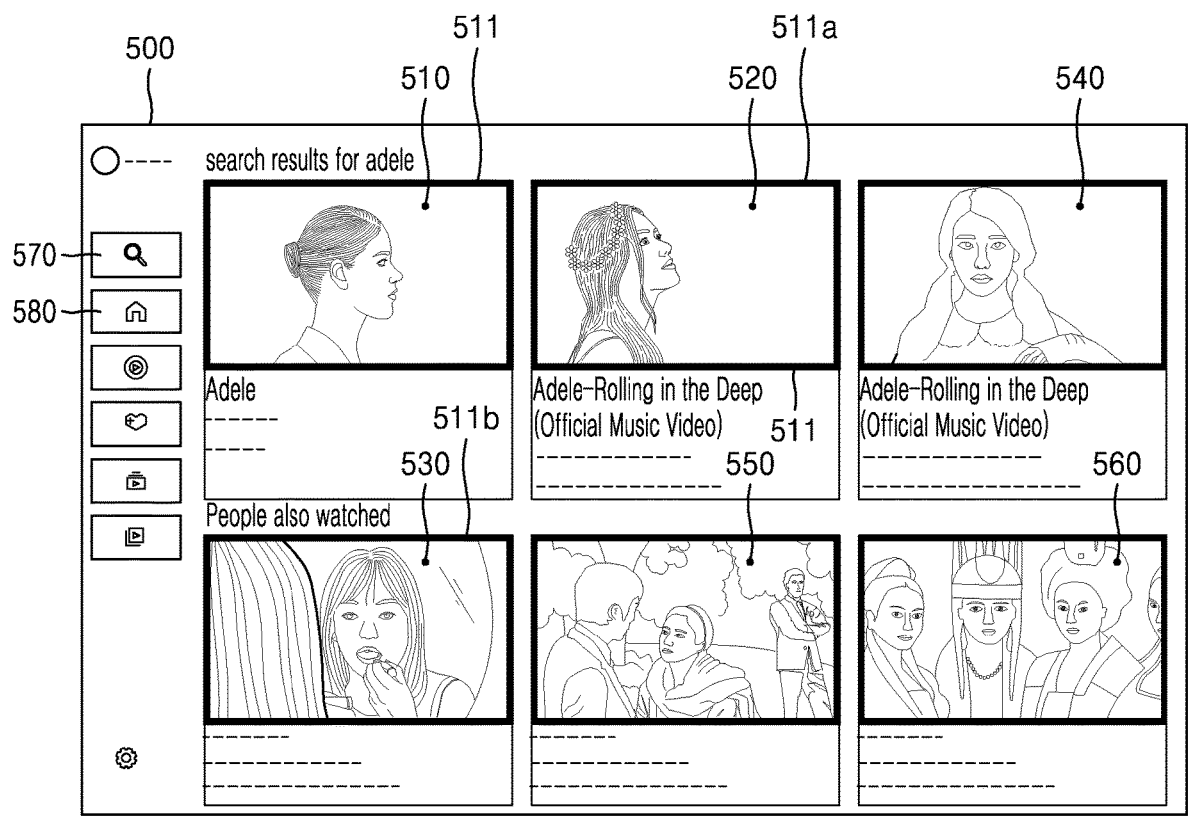

Referring to FIGS. 16 and 17, to group a plurality of objects 510, 520, 530, 570, and 580 in an image 500, a processor 130 may use, for example, a sliding window method. The method of grouping the objects is provided merely as an example, and the technical idea of the disclosure is not limited thereto.

For example, a window 511 corresponding to the first object 510 may be selected. By selecting one of candidate boxes corresponding to the first object 510, the window 511 having the highest reliability for one class may be selected.

By sliding the selected window 511, the objects 520, 530, 570, and 580 other than the first object 510 may correspond to windows 511*a*, 511*b*, and 511*c* located at positions slid from the window 511.

For example, the second object 520 adjacent to the first object 510 in a first direction (x direction) may be located in correspondence with the window 511*a*. The processor 130 may calculate the first reliability for the second object 520, which is a value of probability of second object 520 matching one class in the window 511*a*.

Furthermore, the third object 530 adjacent to the first object 510 in a second direction (y direction) may be located in correspondence with the window 511*b*. The processor 130 may calculate the first reliability for the third object 530, which is a value of probability of third object 530 matching one class in the window 511*b*.

Furthermore, the seventh object 570 adjacent to the first object 510 in a third direction (−x direction) may be located in correspondence with the window 511*c*. The processor 130 may calculate the first reliability for the seventh object 570, which is a value of probability of seventh object 570 matching one class in the window 511*c*.

The seventh object 570 may not be easily matched with the window 511*c* formed based on the first object 510. For example, as the size of the first object 510 is different from that of the seventh object 570, the seventh object 570 may not be matched within the window 511*c*. Accordingly, the first reliability for the seventh object 570 may be low.

On the contrary, the second object 520 and the third object 530 may be easily matched with the window 511 formed based on the first object 510. For example, as the size of the first object 510 is similar to those of the second object 520 and the third object 530, the second object 520 and the third object 530 may be easily matched within the windows 511*b* and 511*c*. Accordingly, the first reliability for the second object 520 and the third object 530 may be high.

The second object 520 and the third object 530 may have similar characteristics to the first object 510. By using such method, as illustrated in FIG. 17, the objects 510, 520, 530, 540, 550, and 560 having similar characteristics to the first object 510 may be classified. For example, the objects 520, 530, and 540 having a similar size to the first object 510 may be classified.

Figure 18:
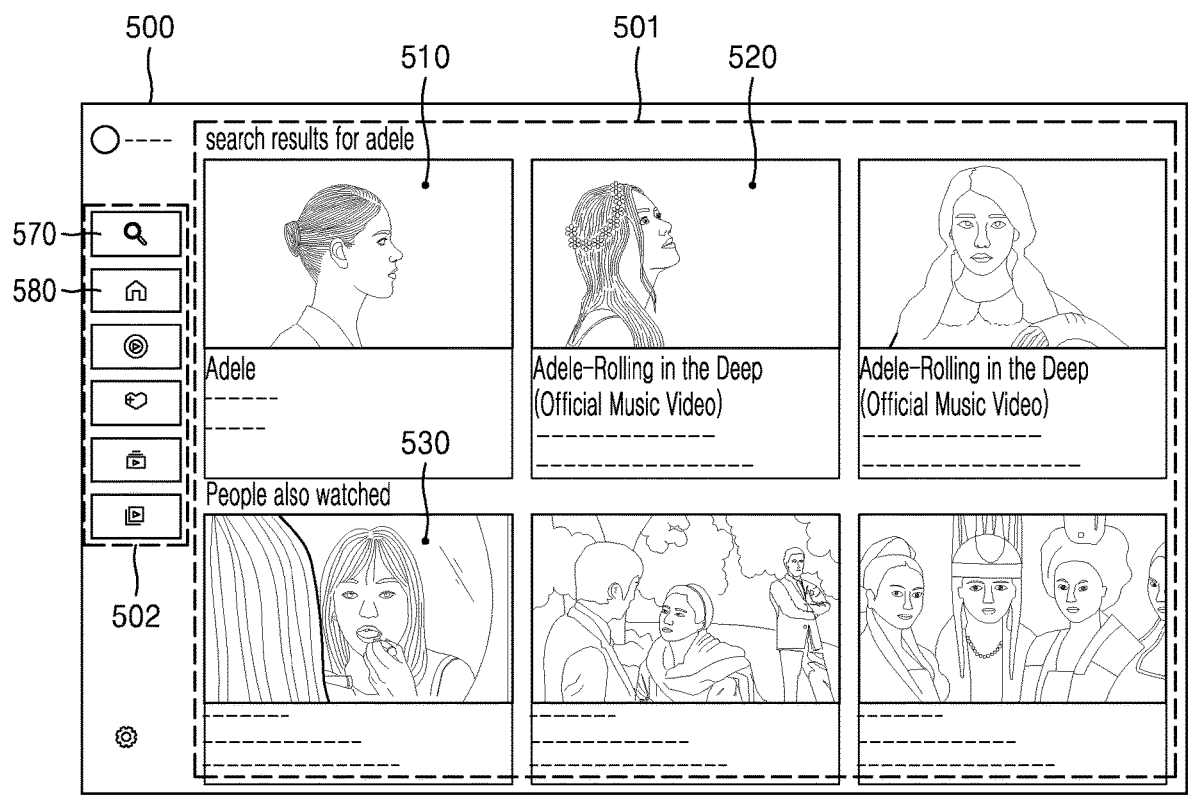

Referring to FIG. 18, objects having similar characteristics may be grouped together.

The plurality of objects 510 to 580 in the image 500 may be grouped into multiple groups (i.e., the first group 501 and a second group 502). For example, the objects 520, 530, 540, 550, and 560 having the similar characteristics to the first object 510 may be grouped into the first object 510, and the objects 570 and 580 having non-similar characteristics to the first object 510 may not be grouped in to the first group 501.

Although it is not shown in the drawings, a window corresponding to the seventh object 570 may be selected as in the grouping process of the first group 501. By sliding the window corresponding to the seventh object 570, the objects 510 to 580 other than the seventh object 570 may correspond to selected windows. Accordingly, the objects 580, etc. having the similar characteristics to the seventh object 570 may be classified. The objects 580, etc. having the similar characteristics to the seventh object 570 may be grouped into the second group 502.

Figure 19:
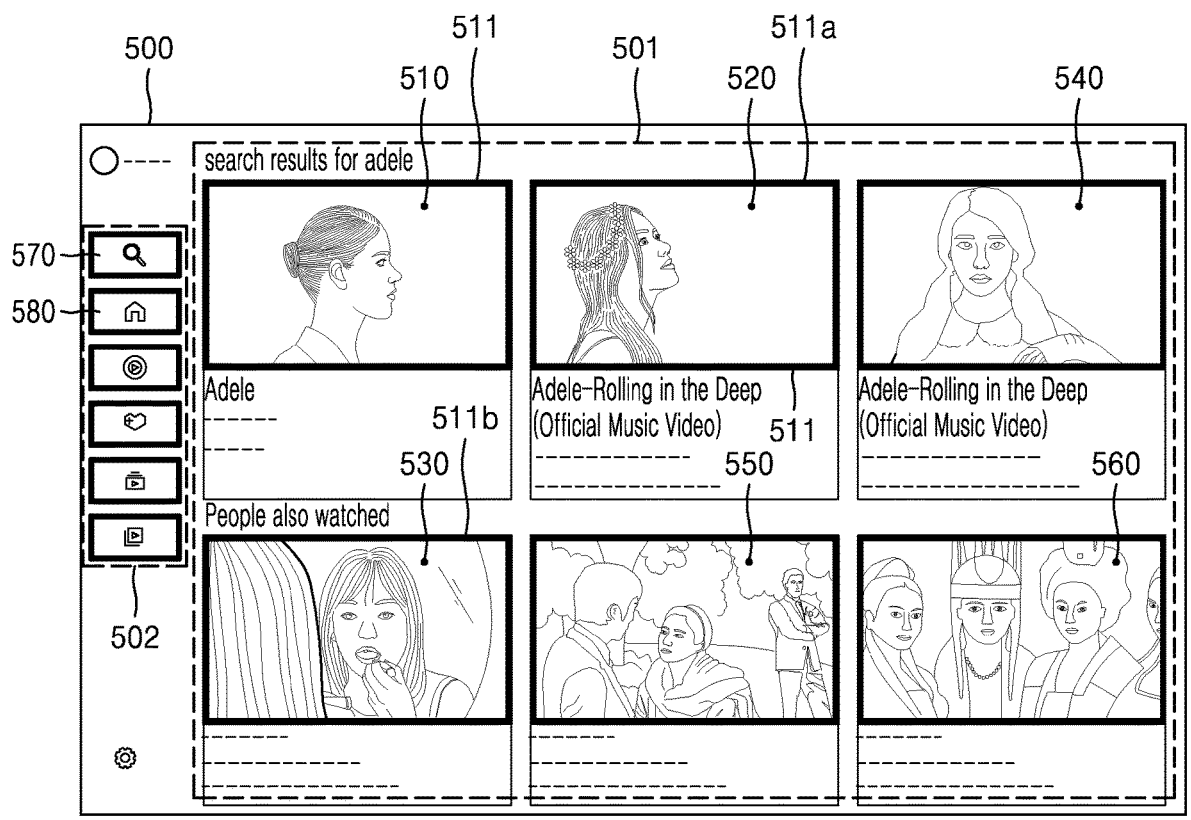

Referring to FIG. 19, a final grid structure may be determined with respect to objects in each group.

For example, a plurality of first candidate boxes may be formed in correspondence with the first object 510 in the first group 501, and a plurality of second candidate boxes may be formed in correspondence with the second object 520 in the first group 501. By selecting one of the plurality of first candidate boxes, a first detection box may be formed, and by selecting one of the plurality of second candidate boxes, a second detection box may be formed. Then, by adjusting a first detection box 512 corresponding to the first object 510 in the first group 501 and a second detection box 522 corresponding to the second object 520 in the first group 501, a plurality of candidate grid structures may be formed. By selecting one of the plurality of candidate grid structures, a final grid structure may be determined.

With respect to the objects in each group, the method of determining the final grid structure may be identical to the method described with reference to FIGS. 7 to 14.

The processor 130 may adjust the first detection box 512 corresponding to the first object 510 in the first group 501 and the second detection box 522 corresponding to the second object 520 in the first group 501 to form a plurality of candidate grid structures by executing one or more instructions and determine a final grid structure by selecting one of the plurality of candidate grid structures.

A recording medium readable by devices may be provided in the form of a non-transitory storage medium. The non-transitory storage medium may merely refer to a tangible device not including a signal (e.g., an electromagnetic wave) and the term of non-transitory storage medium may not distinguish the concept of semi-permanent storage of data in a storage medium and temporary storage of data in a storage medium. For example, the non-transitory storage medium may include a buffer in which data is stored temporarily.

According to an embodiment of the disclosure, the method according to various embodiments of the disclosure may be included and provided in a computer program product. The computer program product may be traded among sellers and buyers as a commodity. The computer program product may be distributed in a form of a storage medium readable by devices, such as a compact disk read only memory (CD-ROM), etc. or may be distributed online (e.g., download or upload) through an application store or directly between two user devices (e.g., smartphones). In the case of online distribution, at least some of the computer program products (e.g., a downloadable application, etc.) may be at least temporarily stored in a storage medium readable by devices, such as a memory of a manufacturer server, an application store server, or a relay server or temporarily generated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device configured to detect a target object, the electronic device comprising:
a display;
a memory storing one or more instructions; and
a processor configured to execute the one or more instructions stored in the memory to:
apply an image including a first object and a second object to an artificial intelligence model to obtain output data including first output data regarding the first object and second output data regarding the second object,
wherein the first output data regarding the first object includes data regarding a plurality of first candidate boxes corresponding to the first object,
wherein the second output data regarding the second object includes data regarding a plurality of second candidate boxes corresponding to the second object, and
wherein the processor is further configured to:
determine a first detection box corresponding to the first object by selecting one of the plurality of first candidate boxes,
determine a second detection box corresponding to the second object by selecting one of the plurality of second candidate boxes,
wherein the first detection box is used for detecting the first object in the image,
wherein the second detection box is used for detecting the second object in the image, and
wherein the artificial intelligence model is trained to:
obtain a training image including a third object and a fourth object adjacent to the third object,
output a plurality of third candidate boxes corresponding to the third object and a plurality of fourth candidate boxes corresponding to the fourth object, by using the training image, and
determine sizes of the plurality of third candidate boxes and the plurality of fourth candidate boxes by using a loss function for reducing a size difference between the third candidate boxes and the fourth candidates boxes.

2. The electronic device of claim 1, wherein, by the trained artificial intelligence model, the first output data includes data regarding positions of the plurality of first candidate boxes determined in consideration of position information of the plurality of second candidate boxes.

3. The electronic device of claim 1,
wherein the first detection box is determined by selecting one of the plurality of first candidate boxes, based on a first reliability and a second reliability,
wherein the first reliability represents a degree of correspondence of the plurality of first candidate boxes to the first object in the image, and
wherein the second reliability represents a relation between the plurality of first candidate boxes and the plurality of second candidate boxes in the image.

4. The electronic device of claim 3, wherein the first detection box is determined by selecting a first candidate box having a highest sum of the first reliability and the second reliability.

5. The electronic device of claim 3,
wherein the less a difference between a length of the second candidate boxes in a first direction and a length of the first candidate boxes in the first direction is, the greater the second reliability is, and
wherein the less a difference between a length of the second candidate boxes in a second direction, which is different from the first direction, and a length of the first candidate boxes in the second direction is, the greater the second reliability is.

6. The electronic device of claim 1, wherein the processor is further configured to execute the one or more instructions to:
form, after determining the first detection box and the second detection box, a plurality of candidate grid structures by adjusting the first detection box and the second detection box to be in a form of a grid; and
determine a final grid structure including the adjusted first detection box and the adjusted second detection box, by selecting one of the plurality of candidate grid structures.

7. The electronic device of claim 6,
wherein the first detection box is determined by selecting one of the plurality of first candidate boxes, based on a first reliability and a second reliability,
wherein the first reliability represents a degree of correspondence of the plurality of first candidate boxes to the first object in the image,
wherein the second reliability represents a relation between the plurality of first candidate boxes and the plurality of second candidate boxes in the image, and
wherein the final grid structure is determined by selecting a candidate grid structure having a highest sum of first reliabilities of a plurality of detection boxes in one candidate grid structure, among the plurality of candidate grid structures.

8. The electronic device of claim 6, wherein the processor is configured to execute the one or more instructions to:
group at least the first object and the second object into a first group; and
form the plurality of candidate grid structures by adjusting the first detection box corresponding to the first object in the first group and the second detection box corresponding to the second object in the first group.

9. The electronic device of claim 1,
wherein the third object and the fourth object are arranged adjacent to each other in a first direction, and
wherein the artificial intelligence model is trained so that the closer a position of a third candidate box in a first direction and a position of a fourth candidate box in the first direction are, the less a difference between a length of the third candidate box in a second direction, which is different from the first direction, and a length of the fourth candidate box in the second direction is.

10. A method of detecting a target object, the method comprising:
obtaining output data including first output data regarding a first object and second output data regarding a second object, by applying an image including the first object and the second object to an artificial intelligence model,
wherein the first output data regarding the first object includes data regarding a plurality of first candidate boxes corresponding to the first object, and wherein the second output data regarding the second object includes data regarding a plurality of second candidate boxes corresponding to the second object;

determining a first detection box corresponding to the first object by selecting one of the plurality of first candidate boxes; and determining a second detection box corresponding to the second object by selecting one of the plurality of second candidate boxes, wherein the first detection box is used for detecting the first object in the image, wherein the second detection box is used for detecting the second object in the image, and wherein the artificial intelligence model is trained to:
obtain a training image including a third object and a fourth object adjacent to the third object,
output a plurality of third candidate boxes corresponding to the third object and a plurality of fourth candidate boxes corresponding to the fourth object, by using the training image, and
determine sizes of the plurality of third candidate boxes and the plurality of fourth candidate boxes by using a loss function for reducing a size difference between the third candidate boxes and the fourth candidates boxes.

11. The method of claim 10, wherein, by the trained artificial intelligence model, the first output data includes data regarding positions of the plurality of first candidate boxes determined in consideration of position information of the plurality of second candidate boxes.

12. The method of claim 10,
wherein the determining of the first detection box comprises:
calculating a first reliability and a second reliability, with respect to the plurality of first candidate boxes,
wherein the first reliability represents a degree of correspondence of the plurality of first candidate boxes to the first object in the image,
wherein the second reliability represents a relation between the plurality of first candidate boxes and the plurality of second candidate boxes in the image; and
wherein the determining of the first detection box further comprises:
selecting a first candidate box having a highest sum of the first reliability and the second reliability, among the plurality of first candidate boxes; and
removing a plurality of unselected first candidate boxes, excluding the selected first candidate box.

13. The method of claim 12,
wherein the less a difference between a length of the second candidate boxes in a first direction and a length of the first candidate boxes in the first direction is, the greater the second reliability is, and
wherein the less a difference between a length of the second candidate boxes in a second direction, which is different from the first direction, and a length of the first candidate boxes in the second direction is, the greater the second reliability is.

14. The method of claim 12, further comprising:
forming, after determining the first detection box and the second detection box, a plurality of candidate grid structures by adjusting the first detection box and the second detection box to be in a form of a grid; and
determining a final grid structure including the adjusted first detection box and the adjusted second detection box, by selecting one of the plurality of candidate grid structures.

15. The method of claim 14,
wherein the first detection box and the second detection box are arranged adjacent to each other in a first direction, and
wherein the forming of the plurality of candidate grid structures comprises forming the plurality of candidate grid structures so that a length of the first detection box in a second direction, which is different from the first direction, is identical to a length of the second detection box in the second direction.

16. The method of claim 14, wherein the determining of the final grid structure comprises:
calculating a sum of first reliabilities of a plurality of detection boxes included in one candidate grid structure, among the plurality of candidate grid structures; and
determining the final grid structure by selecting a candidate grid structure having the highest sum of the first reliabilities.

17. The method of claim 14, wherein the forming of the plurality of candidate grid structures comprises:
grouping at least the first object and the second object into a first group; and
forming the plurality of candidate grid structures by adjusting the first detection box corresponding to the first object in the first group and the second detection box corresponding to the second object in the first group.

18. The method of claim 10,
wherein the third object and the fourth object are arranged adjacent to each other in a first direction, and
wherein the artificial intelligence model is trained so that the closer a position of a third candidate box in the first direction and a position of a fourth candidate box in the first direction are, the less a difference between a length of the third candidate box in a second direction, which is different from the first direction, and a length of the fourth candidate box in the second direction is.

19. The method of claim 18,
wherein the training image further includes a fifth object,
wherein the third object and the fifth object are arranged adjacent to each other in the second direction, and
wherein the artificial intelligence model is further configured to output a plurality of fifth candidate boxes corresponding to the fifth object, by using the training image, and is trained so that the closer a position of the third candidate box in the second direction and a position of the fifth candidate box in the second direction are, the less a difference is between a length of the third candidate box in the first direction, and a length of the fifth candidate box in the first direction.

20. A non-transitory computer-readable recording medium having recorded thereon a program for implementing the method of claim 10.

* * * * *